US008852523B1

(12) United States Patent
Roper

(10) Patent No.: US 8,852,523 B1
(45) Date of Patent: Oct. 7, 2014

(54) ORDERED OPEN-CELLULAR MATERIALS FOR MASS TRANSFER AND/OR PHASE SEPARATION APPLICATIONS

(75) Inventor: Christopher S. Roper, Malibu, CA (US)

(73) Assignee: HRL Laboratories, LLC, Malibu, CA (US)

(*) Notice: Subject to any disclaimer, the term of this patent is extended or adjusted under 35 U.S.C. 154(b) by 1144 days.

(21) Appl. No.: 12/405,996

(22) Filed: Mar. 17, 2009

(51) Int. Cl.
| | |
|---|---|
| B01D 11/04 | (2006.01) |
| B07B 13/00 | (2006.01) |
| B07B 13/04 | (2006.01) |
| B07B 7/04 | (2006.01) |
| B01D 15/00 | (2006.01) |
| B01J 19/24 | (2006.01) |
| B01D 15/34 | (2006.01) |
| B01D 11/02 | (2006.01) |

(52) U.S. Cl.
CPC .......... *B01D 11/04* (2013.01); *B01J 19/24* (2013.01); *B01D 15/34* (2013.01); *B07B 13/04* (2013.01); *B01D 11/02* (2013.01); *B07B 7/04* (2013.01)
USPC ........... 422/222; 210/417; 210/456; 210/506; 210/644; 210/198.1; 422/255; 209/659; 209/675; 209/660

(58) Field of Classification Search
CPC .... B01D 11/02; B01D 11/04; B01D 11/0426; B01D 15/34; B01J 19/24; B07B 7/04; B07B 7/06; B07B 13/04
See application file for complete search history.

(56) References Cited

U.S. PATENT DOCUMENTS

| | | | |
|---|---|---|---|
| 3,446,593 A | 5/1969 | Moutaud | |
| 4,022,875 A | 5/1977 | Vinton et al. | |
| 4,568,595 A | 2/1986 | Morris | |
| 4,575,330 A | 3/1986 | Hull | |
| 4,724,593 A * | 2/1988 | Lang | ............................ 29/896.6 |
| 5,006,937 A | 4/1991 | Nonoshita et al. | |
| 5,185,297 A | 2/1993 | Park et al. | |
| 5,401,694 A | 3/1995 | Gesing et al. | |
| 5,402,514 A | 3/1995 | Booth et al. | |
| 6,241,222 B1 * | 6/2001 | Lang | ............................... 261/94 |
| 6,274,288 B1 | 8/2001 | Kewitsch et al. | |
| 6,387,593 B1 | 5/2002 | Kewitsch et al. | |
| 6,500,401 B2 | 12/2002 | Reznek et al. | |
| 6,592,787 B2 | 7/2003 | Pickrell et al. | |

(Continued)

OTHER PUBLICATIONS

Kewitsch et al., "Nonlinear Optical Properties of Photoresists for Projection Lithography", Applied Physics Letters, Jan. 22, 1996, 455-457, vol. 68 (No. 4), USA.

(Continued)

*Primary Examiner* — Katherine Zalasky
(74) *Attorney, Agent, or Firm* — Christie, Parker & Hale, LLP

(57) ABSTRACT

A mass transfer system including a housing and a three-dimensional ordered open-cellular micro-truss material within the housing for a mass transfer application. Here, the three-dimensional ordered open-cellular micro-truss material includes a plurality of first truss elements defined by a plurality of first self-propagating polymer waveguides and extending along a first direction, a plurality of second truss elements defined by a plurality of second self-propagating polymer waveguides and extending along a second direction, and a plurality of third truss elements defined by a plurality of third self-propagating polymer waveguides and extending along a third direction. The first, second, and third ordered truss elements interpenetrate each other at a plurality of nodes to form a continuous material. In one embodiment, the continuous material is a metal material.

25 Claims, 20 Drawing Sheets

(56) References Cited

U.S. PATENT DOCUMENTS

| | | | |
|---|---|---|---|
| 6,631,231 | B2 | 10/2003 | Mizuuchi et al. |
| 6,650,817 | B2 | 11/2003 | Murali |
| 6,660,192 | B1 | 12/2003 | Kim et al. |
| 6,670,039 | B1 | 12/2003 | Nagle et al. |
| 6,684,007 | B2 | 1/2004 | Yoshimura et al. |
| 6,749,931 | B1 | 6/2004 | Pinneo et al. |
| 6,815,052 | B2 | 11/2004 | Pinneo |
| 6,823,116 | B2 | 11/2004 | Inui et al. |
| 6,862,393 | B2 | 3/2005 | Nashimoto |
| 6,879,757 | B1 | 4/2005 | Zhou et al. |
| 6,887,809 | B1 | 5/2005 | Adler |
| 6,898,362 | B2 | 5/2005 | Forbes et al. |
| 6,925,233 | B2 | 8/2005 | Inui et al. |
| 6,932,880 | B2 | 8/2005 | Inui et al. |
| 6,952,504 | B2 | 10/2005 | Bi et al. |
| 6,993,235 | B2 | 1/2006 | Takagi et al. |
| 7,006,747 | B2 | 2/2006 | Escuti et al. |
| 7,020,374 | B2 | 3/2006 | Talin et al. |
| 7,024,093 | B2 | 4/2006 | Shelnut et al. |
| 7,273,516 | B2 * | 9/2007 | Weidmann ............... 96/44 |
| 7,382,959 | B1 * | 6/2008 | Jacobsen ............... 385/129 |
| 7,653,276 | B1 * | 1/2010 | Gross et al. ............... 385/46 |
| 7,653,279 | B1 | 1/2010 | Jacobsen |
| 7,687,132 | B1 | 3/2010 | Gross et al. |
| 7,938,989 | B1 * | 5/2011 | Gross et al. ............ 264/1.27 |
| 2004/0021237 | A1 | 2/2004 | Shimizu et al. |
| 2004/0154252 | A1 | 8/2004 | Sypeck et al. |
| 2004/0200417 | A1 | 10/2004 | Hanawa et al. |
| 2004/0264863 | A1 | 12/2004 | Suzuki et al. |
| 2005/0135745 | A1 | 6/2005 | Greiner et al. |
| 2005/0202206 | A1 | 9/2005 | Wadley et al. |
| 2005/0255289 | A1 | 11/2005 | Wadley |
| 2005/0287696 | A1 | 12/2005 | Dumais et al. |
| 2006/0029348 | A1 | 2/2006 | Kempen et al. |
| 2006/0035386 | A1 * | 2/2006 | Hattori et al. ............ 436/514 |
| 2006/0080835 | A1 | 4/2006 | Kooistra et al. |
| 2006/0181794 | A1 | 8/2006 | Warren |
| 2007/0059224 | A1 * | 3/2007 | Clack ............... 422/186.01 |

OTHER PUBLICATIONS

Shoji et al., "Optically-Induced Growth of Fiber Patterns into a Photopolymerizable Resin", Applied Physics Letters, Aug. 2, 1999, 737-739, vol. 75 (No. 5), USA.

Kagami et al., "Light-Induced Self-Written Three-Dimensional Optical Waveguide", Applied Physics Letters, Aug. 20, 2001, 1079-1081, vol. 79 (No. 8), USA.

Bertsch et al., "Microstereolithography: A Review", Materials Research Symposium Proceedings, 2003, 1-13, vol. 758, USA.

Sun et al., "Two-Photon Photo Polymerization and 3D Lithographic Microfabrication", APS, 2004, 169-273, vol. 170, USA.

Chuang et al., "A New Method to Fabricate Polymer Waveguides", Progress in Electromagnetics Research Symposium, Aug. 22-26, 2005, 92-95, Hangzhou, China.

Jang et al., "3D Polymer Microframes That Exploit Length-Scale-Dependent Mechanical Behavior", Advanced Materials, 2006, 2123-2127, vol. 18.

Evans, "Lightweight Materials and Structures," MRS Bulletin, Oct. 2001, pp. 790-797.

Carbajal, et al., "Thermal response of a flat heat pipe sandwich structure to a localized heat flux," International Journal of Heat and Mass Transfer, vol. 49, No. 21-22, pp. 4070-4081, 2006.

Cumberland, et al., U.S. Appl. No. 12/476,201, filed Jun. 1, 2009, entitled "Composite Truss Armor," Application, Office Actions.

Cumberland, et al., U.S. Appl. No. 12/577,991, filed Oct. 13, 2009, entitled "Micro-Truss Based Composite Friction-and-Wear Apparatus and Methods of Manufacturing the Same," Application, Office Actions.

Evans, et al., "Multifunctionality of cellular metal systems," Progress in Materials Science 43, 1999, pp. 171-221.

Gross, et al., U.S. Appl. No. 12/705,534, filed Feb. 12, 2010, entitled "Ceramic Microtruss," Application, Office Actions.

Jacobsen, et al., U.S. Appl. No. 11/801,908, filed May 10, 2007, entitled Three-Dimensional Ordered Open-Cellular Structures, Application, Office Actions.

Jacobsen, U.S. Appl. No. 11/870,379, filed Oct. 10, 2007, entitled "Ordered Open-Cellular Carbon Microstructures and Method of Making Same," Application, Office Actions.

Jacobsen, et al., U.S. Appl. No. 12/317,210, filed Dec. 18, 2008, entitled "Functionally-Graded Three-Dimensional Ordered Open-Cellular Microstructure and Method of Making Same", Application, Office Actions.

Jacobsen, et al., U.S. Appl. No. 12/455,449, filed Jun. 1, 2009, entitled "Micro-Truss Based Energy Absorption Apparatus," Application, Office Actions.

Lu, et al., Active Cooling by metallic sandwich structures with periodic cores, Progress in Materials Science, 2005, No. 50, pp. 789-815.

Monro, et al., "Topical Review—Catching light in its own trap", Journal of Modern Optics, 2001, vol. 48, No. 2, pp. 191-238.

Queheillalt, et al., "A multifunctional heat pipe sandwich panel structure," International Journal of Heat and Mass Transfer, vol. 51, No. 1-2, pp. 312-326, 2008.

Roper, U.S. Appl. No. 12/405,996, filed Mar. 17, 2009, entitled "Ordered Open-Cellular Materials for Mass Transfer and/or Phase Separation Applications," Application, Office Actions.

Tian, et. al, "The effects of topology upon fluid-flow and heat-transfer within cellular copper structures", International Journal of Heat and Mass Transfer, 2004.

Wadley, et al. "Fabrication and structural performance of periodic cellular metal sandwich structures," Composites Science and Technology, 63, 2003, pp. 2331-2343.

* cited by examiner

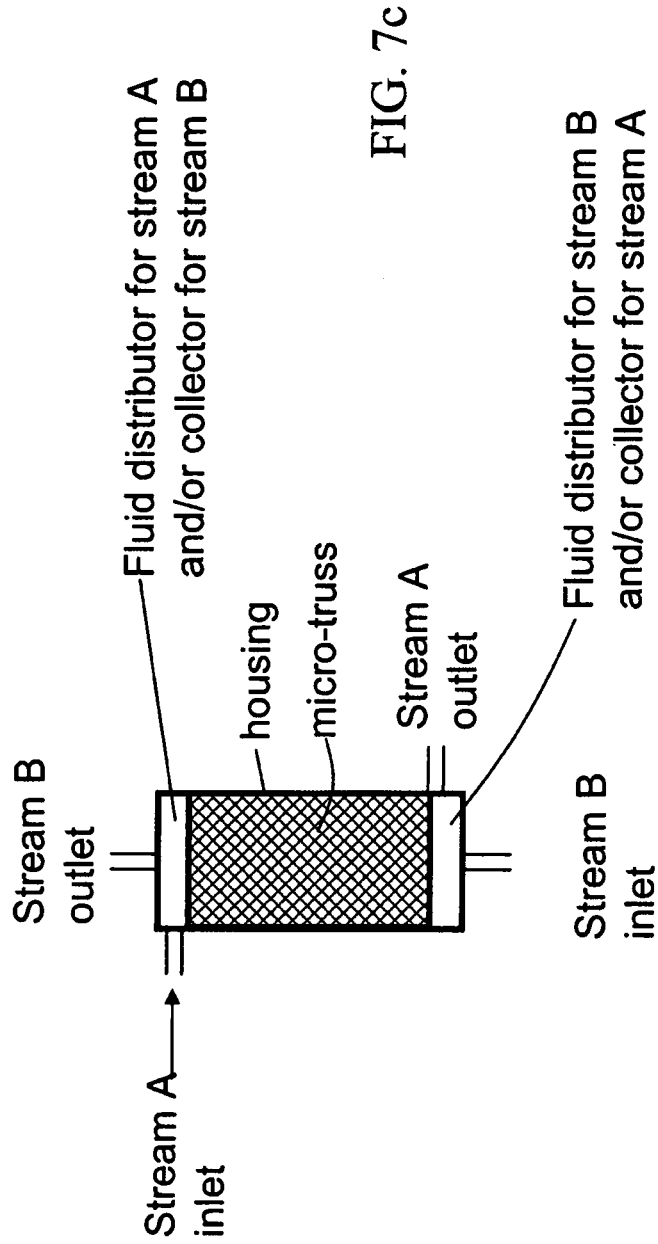

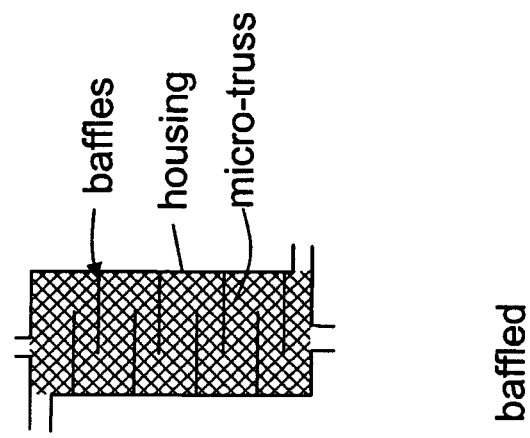
FIG. 7f baffled
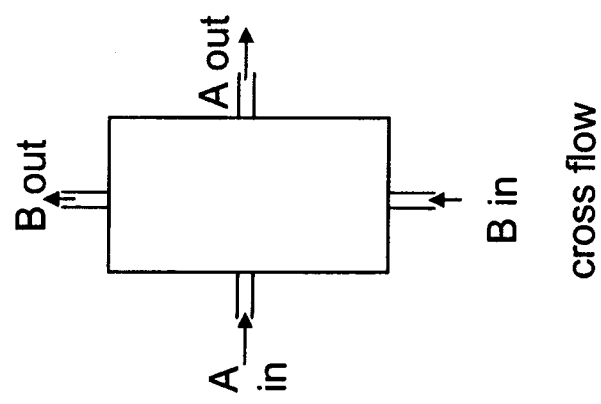
FIG. 7e cross flow
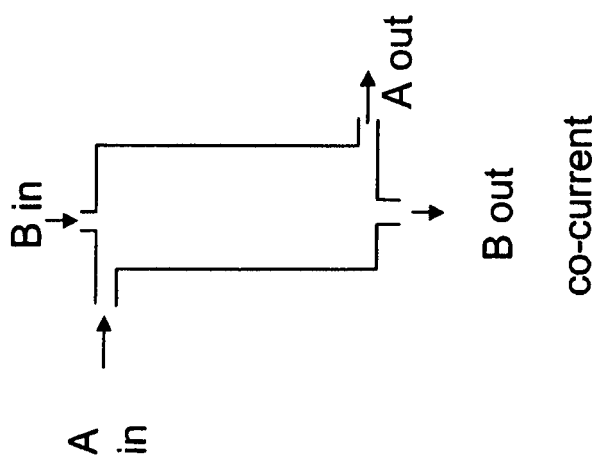
FIG. 7d co-current

ORDERED OPEN-CELLULAR MATERIALS FOR MASS TRANSFER AND/OR PHASE SEPARATION APPLICATIONS

FIELD OF THE INVENTION

The present invention relates to the area of mass transfer (especially liquid-liquid and gas-liquid) as well as phase separation (especially solid-liquid, gas-liquid, solid-solid, and solid-gas).

BACKGROUND OF THE INVENTION

Mass transfer is a physical process that involves diffusive and convective transport of atoms and molecules within physical systems. Mass transfer includes both mixing and separation unit operations. Some common examples of mass transfer processes are the evaporation of water, the diffusion of perfume in air, and the dissolution of sugar in water. Mass transfer is also responsible for the separation of components in an apparatus such as a distillation column.

The driving force for diffusive mass transfer is a difference in chemical potential (or concentration for ideal mixtures); the random motion of molecules causes a net transfer of mass from an area of high chemical potential to an area of low chemical potential. For separation processes, thermodynamics determines the extent of separation, while mass transfer determines the rate at which the separation will occur.

To increase mass-transfer area and/or reduce pressure drop in mass transfer applications, packings can be utilized. In industry, a packed column is a pressure vessel having a packed section. The column can be filled with random dumped packings or structured packing sections, which are arranged or stacked. In the column, liquids tend to wet the surface of the packings and the vapors pass across this wetted surface. Mass transfer takes place across the liquid-vapor interface. In addition, packings can be used to improve separation and/or reduce construction expense and/or provide a lower pressure drop across the column of distillation columns. Differently shaped packings have different surface areas and void space between the packings. Both of these factors affect packing performance.

Existing packings for mass transfer can be divided into random packings and structured packings. Non-limiting examples of random packings include Rashig Rings, Intalox Saddles, Berl Saddles, Pall Rings, and Tellerette; and non-limiting examples of structured packings include corrugated packings, Flexipac, Mellapak, gauzes, grids, and Katapak. Here, random packings have too great of a pressure drop for a given mass transfer area for many applications. Structured packings, while yielding lower pressure drops and often better mass transfer rates than random packings, are expensive to manufacture. In addition, both existing random and structured packings have relatively low surface area to volume ratios.

As such, there is a need for packings that can be easily manufactured while still providing for low pressure drops and high mass transfer rates. In addition, there is a need to have packings with relatively high surface area to volume ratios.

SUMMARY OF THE INVENTION

Aspects of embodiments of the present invention are directed toward a set of applications for ordered open-cellular materials in the area of mass transfer (especially liquid-liquid and gas-liquid) as well as phase separation (especially solid-liquid, gas-liquid, solid-solid, and solid-gas). Aspects of embodiments of the present invention are directed toward applications for ordered open-cellular materials as packings (or packing materials) to increase mass-transfer area and reduce pressure drop.

An aspect of an embodiment of the present invention is directed toward a packing in a mass transfer system capable of increasing mass transfer rates and/or reducing pressure drop in the mass transfer systems, and a mass transfer system including the same. Here, in one embodiment, increased mass transfer rates will reduce the size of the mass transfer system required and reduced pressure drop will decrease the energy requirements for pumping (which is especially beneficial for vacuum distillation). Also, in one embodiment of the present invention, the packings are formed by ordered open-cellular materials that have structural functionality, which can be used to reduce the mass of the mass transfer system in cases where the mass transfer system must bear a mechanical load (e.g. vacuum distillation).

An embodiment of the present invention provides a mass transfer system filled with an ordered open-cellular packing (or packing material) to increase mass-transfer area and reduce pressure drop in the mass transfer system and/or to provide structural support for the mass transfer system. Here, the packings have a set of material properties (density, compressive modulus, compressive strength, surface area to volume ratios, mass transfer rates, etc.) that can be designed to provide the desired structural and mass transfer characteristics.

More specifically, in an embodiment of the present invention, a mass transfer system includes a housing and a three-dimensional ordered open-cellular micro-truss material within the housing for a mass transfer application.

In one embodiment, the three-dimensional ordered open-cellular micro-truss material includes a plurality of first truss elements defined by a plurality of first self-propagating polymer waveguides and extending along a first direction, a plurality of second truss elements defined by a plurality of second self-propagating polymer waveguides and extending along a second direction, and a plurality of third truss elements defined by a plurality of third self-propagating polymer waveguides and extending along a third direction. Here, the first, second, and third ordered truss elements interpenetrate each other at a plurality of nodes to form a continuous material.

In one embodiment, the three-dimensional ordered open-cellular micro-truss material is an ordered open-cellular packing structurally packed within the housing.

In one embodiment, the three-dimensional ordered open-cellular micro-truss material is a plurality of micro-truss bricks packed within the housing.

In one embodiment, the three-dimensional ordered open-cellular micro-truss material is a plurality of micro-truss layers stacked adjacent to one another.

In one embodiment, the three-dimensional ordered open-cellular micro-truss material is a plurality of micro-truss layers stacked adjacent and mechanically connected to one another.

In one embodiment, the three-dimensional ordered open-cellular micro-truss material is a plurality of bricks orderly packed within the housing.

In one embodiment, the three-dimensional ordered open-cellular micro-truss material includes at least two different types of packing materials. The at least two different type of packing materials may include a ceramic packing material and a metal packing material.

In one embodiment, the three-dimensional ordered open-cellular micro-truss material includes a three-dimensional ordered open-cellular micro-truss metal material.

In one embodiment, the three-dimensional ordered open-cellular micro-truss material includes a plurality of mechanical members having a three-dimensional order with a size scale between about 30 μm and about 5 mm to increase a surface area to volume ratio of the three-dimensional ordered open-cellular micro-truss material.

In one embodiment, the three-dimensional ordered open-cellular micro-truss material includes a plurality of mechanical members having a three-dimensional order with a size scale between about 30 μm and about 1 mm to increase a surface area to volume ratio of the three-dimensional ordered open-cellular micro-truss material.

In one embodiment, the three-dimensional ordered open-cellular micro-truss material includes a plurality of mechanical members each having a diameter between about 10 μm and about 2 mm to increase a surface area to volume ratio of the three-dimensional ordered open-cellular micro-truss material.

In one embodiment, the three-dimensional ordered open-cellular micro-truss material includes a plurality of three-dimensional ordered pores (e.g., a plurality of spaces between truss members of the micro-truss material) to lower a pressure drop of a stream passing through the three-dimensional ordered open-cellular micro-truss material as compared to existing packings.

In one embodiment, the three-dimensional ordered open-cellular micro-truss material includes a plurality of three-dimensional ordered load bearing members to increase the mechanical stiffness and strength of the three-dimensional ordered open-cellular micro-truss material.

In one embodiment, the housing includes an inlet and an outlet. Here, the inlet and the outlet are configured to transport a material to and from the three-dimensional ordered open-cellular micro-truss material for the mass transferring application.

In one embodiment, the housing includes a plurality of inlets and a plurality of outlets. Here, the inlets and the outlets are configured to transport a plurality of counter-current streams to and from the three-dimensional ordered open-cellular micro-truss material for the mass transferring application. In addition, one or more of the streams may be a single chemical species or mixture (homogenous or heterogeneous) of chemical species (in vapor, liquid, solid, or a combination of phases).

In one embodiment, the housing includes a plurality of inlets and a plurality of outlets. Here, the inlets and the outlets are configured to transport a plurality co-current streams to and from the three-dimensional ordered open-cellular micro-truss material for the mass transferring application.

In one embodiment, the housing includes a plurality of inlets and a plurality of outlets. Here, the inlets and the outlets are configured to transport a plurality of cross-current streams to and from the three-dimensional ordered open-cellular micro-truss material for the mass transferring application.

In one embodiment, the mass transfer system further includes a plurality of baffles within the housing with three-dimensional ordered open-cellular micro-truss packing material. Here, the housing includes a plurality of inlets and a plurality of outlets, and the inlets and the outlets are configured to transport a plurality of streams to and from the three-dimensional ordered open-cellular micro-truss material for the mass transferring application.

In one embodiment, the mass transfer system further includes a first fluid distributor and collector and a second fluid distributor and collector. Here, the housing includes a first inlet, a second inlet, a first outlet, and a second outlet. In addition, the first fluid distributor and collector is configured such that a first stream entering through the first inlet and a second stream exiting thought the second outlet have to first pass through the first fluid distributor and collector, and the second fluid distributor and collector is configured such that the second stream entering through the first inlet and the first stream exiting thought the first outlet have to first pass through the second fluid distributor and collector.

In one embodiment, the housing includes a first stream inlet, a second stream inlet, and a mixed stream outlet. Here, the first stream inlet, the second stream inlet, and the mixed stream outlet are configured to transport a plurality of streams to the three-dimensional ordered open-cellular micro-truss material and a mixed stream from the three-dimensional ordered open-cellular micro-truss material for the mass transferring application.

In one embodiment, the housing includes a contaminated stream inlet, a purified stream outlet, and a collected contaminant outlet. Here, the contaminated stream inlet, the purified stream outlet, and the collected contaminant outlet are configured to transport a contaminated stream to the three-dimensional ordered open-cellular micro-truss packing material and a purified stream and collected contaminants from the three-dimensional ordered open-cellular micro-truss packing material.

In one embodiment, the mass transfer system is a gas-liquid contacting system, a liquid-liquid contacting system, a static fluid-fluid mixing system, a phase separation system, or a packed bed reactor system. Non-limiting examples of applications for the gas-liquid contacting and liquid-liquid contracting systems include distillation/fractionation (e.g., atmospheric pressure distillation, vacuum distillation, etc.), adsorption, stripping, and liquid-liquid extraction.

In one embodiment, the ordered open-cellular micro-truss material is configured as a support for supporting a plurality of random packings within the housing.

In one embodiment, the mass transfer system further includes an ionizing section and a collecting section in the housing for an electrostatic precipitation application. Here, the ionizing section and/or the collecting section includes the ordered open-cellular micro-truss packing material.

In one embodiment, the ordered open-cellular micro-truss material includes a first three-dimensional pattern, and a second three-dimensional pattern differing from the first three-dimensional pattern. The first and second three-dimensional patterns may have order in three dimensions.

In one embodiment, the ordered open-cellular micro-truss material further includes a plurality of first truss elements defined by a plurality of first self-propagating polymer waveguides of the first three-dimensional pattern and extending along a first direction, a plurality of second truss elements defined by a plurality of second self-propagating polymer waveguides of the first three-dimensional pattern and extending along a second direction, a plurality of third truss elements defined by a plurality of third self-propagating polymer waveguides of the first three-dimensional pattern and extending along a third direction, a plurality of fourth truss elements defined by a plurality of fourth self-propagating polymer waveguides of the second three-dimensional pattern and extending along a fourth direction, a plurality of fifth truss elements defined by a plurality of fifth self-propagating polymer waveguides of the second three-dimensional pattern and extending along a fifth direction, a plurality of sixth truss elements defined by a plurality of sixth self-propagating polymer waveguides of the second three-dimensional pattern and extending along a sixth direction, and an interface. Here, the first, second, and third truss elements interpenetrate each other at a plurality of first nodes to form a first continuous material, the fourth, fifth, and sixth truss elements interpenetrate each other at a plurality of second nodes to form a second continuous material, and the interface includes a plurality of third nodes for connecting the first continuous material to the second continuous material.

In one embodiment, the ordered open-cellular micro-truss material is configured as a support for supporting a filter within the housing.

In another embodiment of the present invention, a solid particle sorting apparatus includes an ordered open-cellular micro-truss sorter, a collector of larger particles, and a collector of smaller particles. Here, an inlet of the solid particle sorting apparatus is configured to receive small and large particles and to provide the small and large particles to the ordered open-cellular micro-truss sorter via a chute of the solid particle sorting apparatus such that the small and large particles are sorted and collected at the collector of larger particles and the collector of smaller particles.

In another embodiment of the present invention, a method of performing a mass transfer operation is provided. The method includes: forming a three-dimensional ordered open-cellular micro-truss packing material; placing the three-dimensional ordered open-cellular micro-truss material into a housing; and performing the mass transfer operation by utilizing the three-dimensional ordered open-cellular micro-truss material.

In one embodiment, the forming of the three-dimensional ordered open-cellular micro-truss material includes converting the open-cellular polymer micro-truss structure into an open-cellular metal or ceramic micro-truss structure.

In another embodiment of the present invention, a solid particle sorting apparatus includes an inlet, a chute, an ordered open-cellular micro-truss sorter, a collector of larger particles, and a collector of smaller particles. Here, the inlet is configured to receive small and large particles and to provide the small and large particles to the ordered open-cellular micro-truss sorter via the chute such that the small and large particles are sorted and collected at the collector of larger particles and the collector of smaller particles.

In another embodiment of the present invention, a method of forming a mass transfer system is provided. The method includes: forming a three-dimensional ordered open-cellular micro-truss packing material; and placing the three-dimensional ordered open-cellular micro-truss material into a housing for a mass transferring application.

In one embodiment, the forming of the three-dimensional ordered open-cellular micro-truss material includes: securing a volume of a photo-monomer; securing a mask between at least one collimated light source and the volume of the photo-monomer, the mask having a plurality of apertures; directing a collimated light beam from the at least one collimated light source to the mask for a period of exposure time such that a portion of the collimated light beam passes through the mask and is guided by the plurality of apertures into the photo-monomer to form a plurality of waveguides through a portion of the volume of the photo-monomer; removing any uncured photo-monomer to leave behind the open-cellular polymer micro-truss structure having a plurality of truss elements defined by the plurality of waveguides; and forming the three-dimensional ordered open-cellular micro-truss material defined by the open-cellular polymer micro-truss structure. The forming of the three-dimensional ordered open-cellular micro-truss material may include converting the open-cellular polymer micro-truss structure into an open-cellular metal or ceramic micro-truss structure.

BRIEF DESCRIPTION OF THE DRAWINGS

The accompanying drawings, together with the specification, illustrate exemplary embodiments of the present invention, and, together with the description, serve to explain the principles of the present invention.

FIGS. 7a, 7b, 7c, 7d, 7e, and 7f schematically illustrate mass transfer systems in the forms of mass-transfer columns according to embodiments of the present invention.

DETAILED DESCRIPTION

In the following detailed description, only certain exemplary embodiments of the present invention are shown and described, by way of illustration. As those skilled in the art would recognize, the described exemplary embodiments may be modified in various ways, all without departing from the spirit or scope of the present invention. Accordingly, the drawings and description are to be regarded as illustrative in nature, and not restrictive.

In the context of embodiments of the present invention, a three-dimensional ordered microstructure is referred to as an ordered three-dimensional structure at the micrometer scale. In one embodiment of the present invention, a mass transfer system with a packing (or packing material) composed of a three-dimensional ordered microstructure is provided. Here, the packing in the mass transfer system is capable of increasing mass transfer rate and/or reducing pressure drop in the mass transfer system.

In one embodiment, the mechanical members of the three-dimensional ordered microstructure have a three-dimensional order that is on a size scale (i.e., distance from one node to another node) between 30 μm and 5 mm (which leads to surface area to volume ratios higher than existing ordered packings (i.e., both structured and grid packings)). In another embodiment, the mechanical members of the three-dimensional ordered microstructure have a three-dimensional order that is on a size scale (i.e., distance from one node to another node) between 30 μm and 1 mm.

Figure 1:
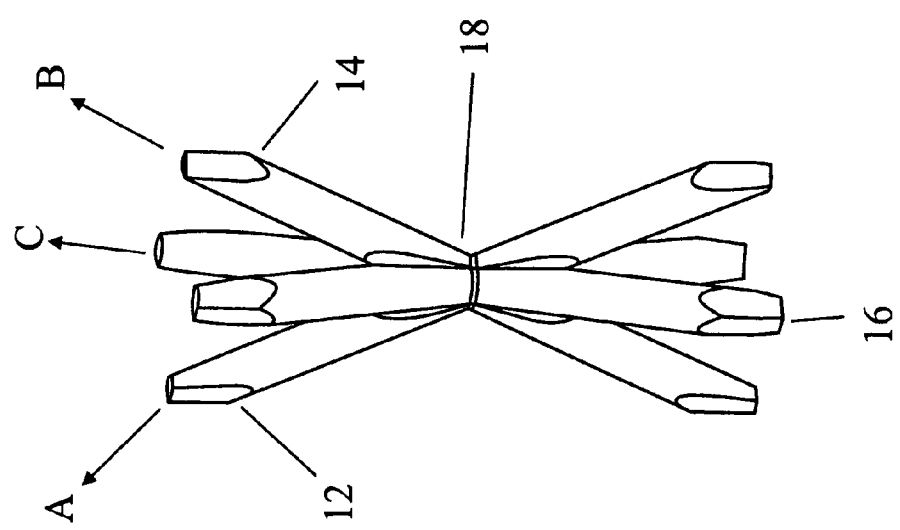
FIG. 1 is a perspective schematic view of a portion of a structure according to an embodiment of the present invention.
Figure 1:
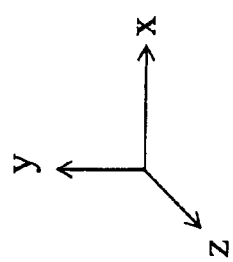
Figure 2:
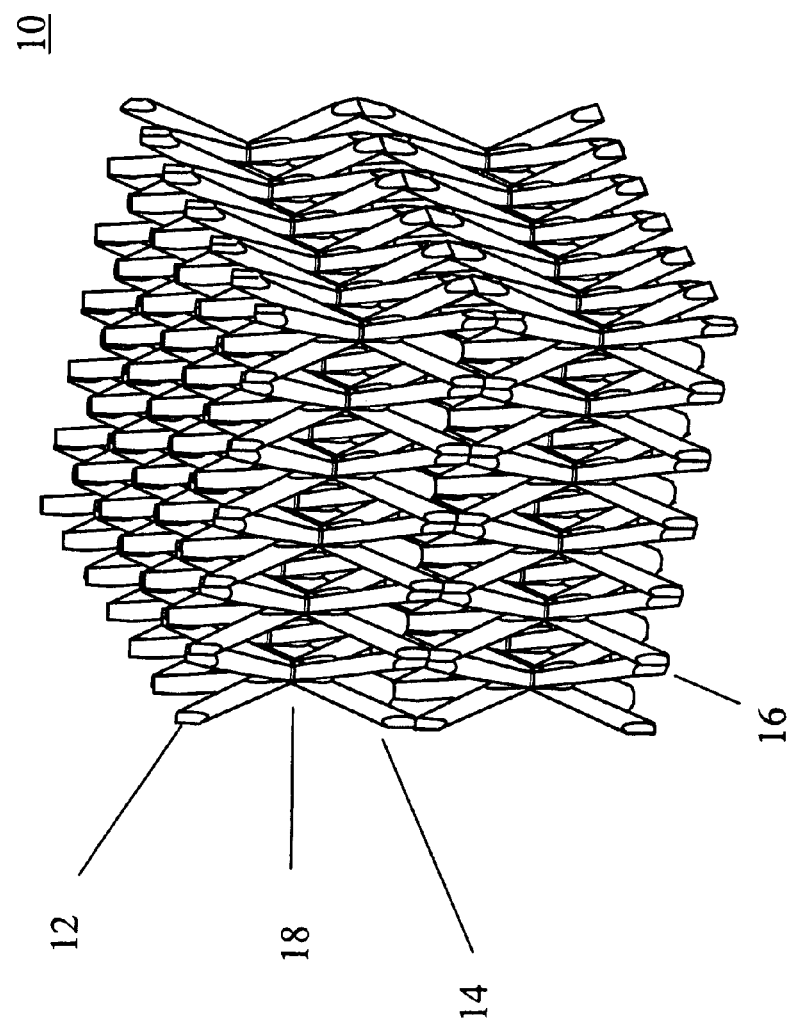
FIG. 2 is a perspective schematic view of a structure according to an embodiment of the present invention.

Referring to FIGS. 1 and 2, a three-dimensional ordered open-cellular microstructure 10 according to an embodiment of the present invention is a self-supporting structure. In one embodiment of the present invention, this three-dimensional ordered open-cellular microstructure 10 can be utilized as a three-dimensional ordered microstructure to define (or derive) the final shape and dimensions of a three-dimensional packing material. The microstructure 10 includes first truss elements 12, second truss elements 14, and third truss elements 16. The first truss elements 12 are defined by first self-propagating polymer waveguides and extend along a first direction A. The second truss elements 14 are defined by second self-propagating polymer waveguides and extend along a second direction B. The third truss elements 16 are defined by third self-propagating polymer waveguides and extend along a third direction C. With reference to FIGS. 1 and 2, the truss elements 12, 14, 16 interpenetrate each other at nodes 18 to form a continuous material with a three-dimensional microstructure order and having a plurality of three-dimensional ordered pores (or spaces) defined by (or between) the truss elements 12, 14, 16 and the nodes 18. Here, in one embodiment of the present invention, the three-dimensional ordered pores (or spaces) can be utilized in a mass transfer system to lower the pressure drop of a stream passing therethrough as compared to existing packings used for mass transfer.

In one embodiment, the truss elements 12, 14, 16 include a photo-polymer material. In one embodiment, the truss elements 12, 14, 16 are polymer optical waveguide truss elements.

In one embodiment, the continuous material is continuously formed such that it lacks any interior boundaries, e.g., boundaries within the interpenetrating portions of truss elements 12, 14, 16. In another embodiment, each node 18 of the microstructure 10 is formed of the continuous material.

According to one embodiment of the present invention, the microstructure 10 is formed by using a fixed light input (collimated UV light) to cure (polymerize) polymer optical waveguides, which can self-propagate in a 3D pattern. As such, the propagated polymer optical waveguides form the microstructure 10. Here, the microstructure 10 in FIG. 2 is shown to be composed of two layers of the truss elements 12, 14, 16 which interpenetrate each other at the nodes 18 stacked adjacent to one other, but the present invention is not limited to only two layers. For example, in one embodiment, three or more layers can be utilized. Also, each of the layers may be continuous for a structure with an overall thickness of one inch, and thicker layers may be built of stacked thinner layers adjacent to one other (e.g., stacked adjacent and mechanically connected to one another or stacked adjacent (and not mechanically connected to one another)).

As disclosed in Monro et al. "Topical Review Catching Light In Its Own Trap," Journal Of Modern Optics, 2001, Vol. 48, No. 2, 191-238, which is incorporated by reference herein in its entirety, some liquid polymers, referred to as photopolymers, undergo a refractive index change during the polymerization process. The refractive index change can lead to a formation of polymer optical waveguides. If a monomer that is photo-sensitive is exposed to light (typically UV) under the right conditions, the initial area of polymerization, such as a small circular area, will "trap" the light and guide it to the tip of the polymerized region, further advancing that polymerized region. This process will continue, leading to the formation of a waveguide structure with approximately the same cross-sectional dimensions along its entire length.

According to one embodiment of the present invention, a mask with a two-dimensional pattern of apertures (see FIG. 3) is used to create a three-dimensional polymer microstructure (or an open-cellular polymer micro-truss structure).

Figure 3:
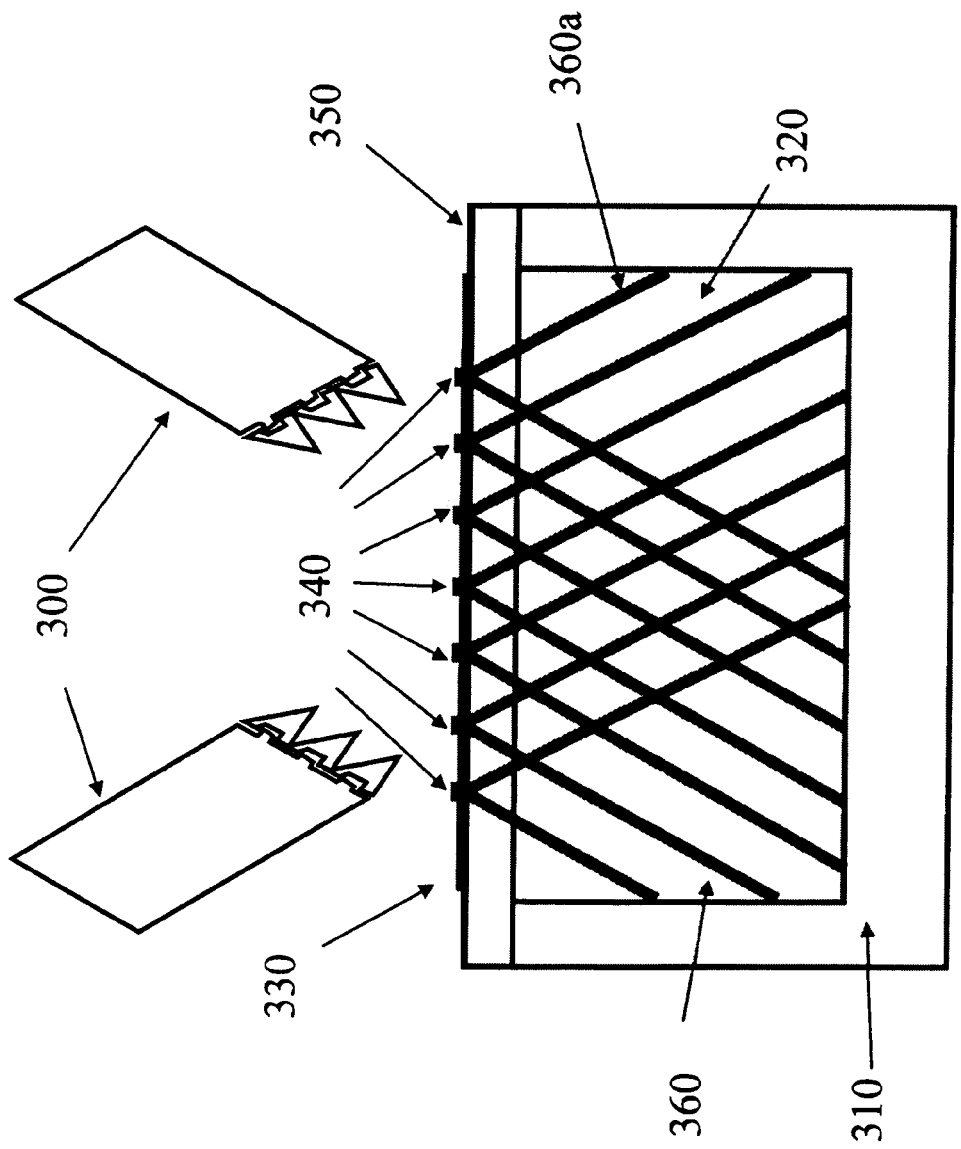
FIG. 3 is a schematic diagram of a system for forming a structure of an embodiment of the present invention from multiple waveguides created using a single collimated beam or multiple collimated beams through multiple apertures.
Figure 4B:
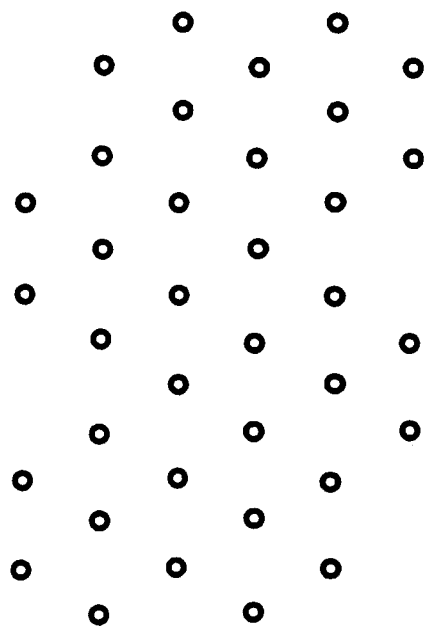
FIG. 4b illustrates an example of a hexagonal mask pattern (or a hexagonal mask aperture pattern) according to embodiments of the present invention.
Figure 4A:
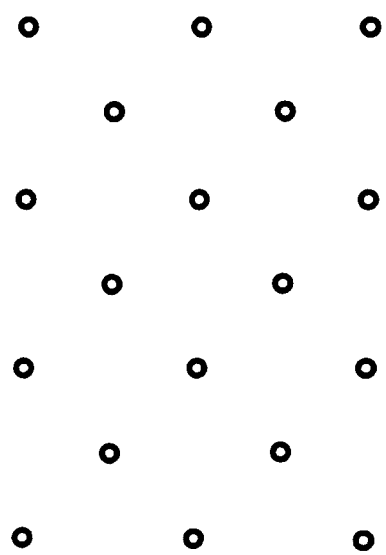
FIG. 4a illustrates an example of a square mask pattern (or a square mask aperture pattern) according to embodiments of the present invention.

With reference to FIG. 3, a system for forming a three-dimensional polymer microstructure according to an embodiment of the present invention includes one or more collimated light sources 300, a reservoir (mold) 310 having a volume of monomer 320 that will polymerize at a wavelength of collimated light beams provided by the light sources 300, and a patterning apparatus, such as a mask 330 with multiple apertures (open areas) 340. Each of the apertures 340 has a given shape and dimension substantially matching a cross-section geometry of a waveguide (e.g., waveguide 360a). Between the mask 330 and the monomer 320, there may be a substrate 350. Here, in FIG. 3, a truly 3D network can be formed because the intersecting polymer waveguides 360 will simply polymerize together, but will not interfere with waveguide propagation. Also, the spacing between the plurality of waveguides 360 corresponds with the pattern of the plurality of apertures 340. The pattern of the apertures 340 may, for example, be in a square pattern as shown in FIG. 4a and/or in a hexagonal pattern as shown in FIG. 4b. The hole (aperture) spacing, i.e., distance between apertures 340 in the mask 330, and the number of waveguides 360 formed from each of the apertures 340 will determine the open volume fraction (i.e. open space) of the formed three-dimensional ordered microstructure (or the formed open-cellular polymer micro-truss structure).

As such, through the system of FIG. 3, a three-dimensional ordered microstructure of an embodiment of the present invention can be designed for a given application. The design parameters include: 1) the angle and pattern of the polymer waveguides with respect to one another, 2) the relative density of the resulting cellular structure (or the open volume fraction), and 3) the cross-sectional shape and dimensions of the polymer waveguides.

Figure 5:
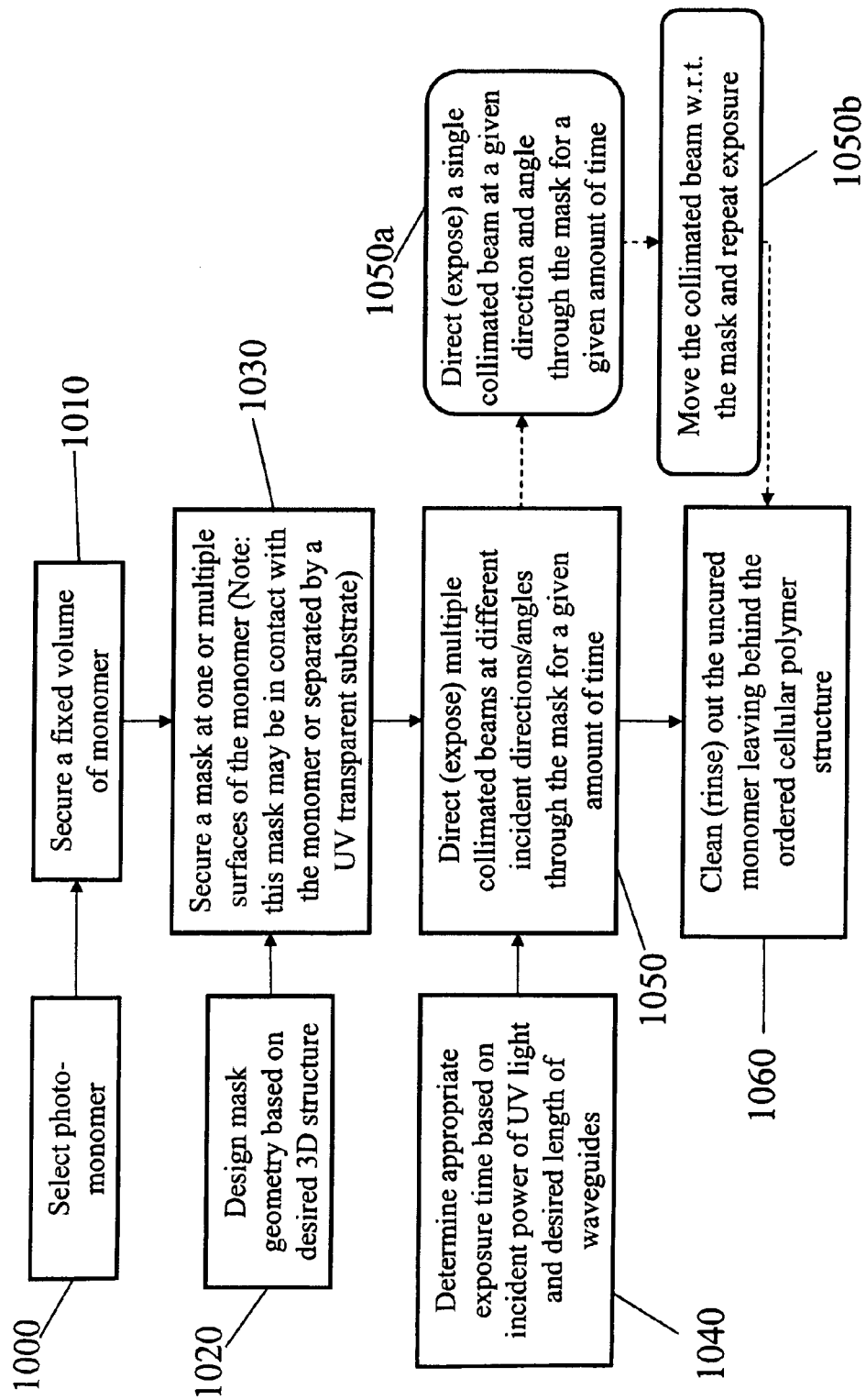
FIG. 5 is a process flow diagram for forming one or more polymer waveguides of a structure according to an embodiment of the present invention.

In more detail, FIG. 5 shows a method of forming a three-dimensional ordered microstructure (or an open-cellular polymer micro-truss structure) according to an embodiment of the present invention. As illustrated in FIG. 5, a photo-monomer is selected in block 1000. In block 1010, a volume of the selected photo-monomer is secured (e.g., in a reservoir). A mask geometry is designed based on a desired three-dimensional structure in block 1020. A patterning apparatus, such as a mask having the designed geometry, is secured in block 1030. Here, the secured mask has at least one aperture between at least one collimated light source and the volume of the selected photo-monomer. In addition, the mask may be in contact with the monomer or separated by a substrate (e.g., by a UV transparent substrate).

In block 1040, an appropriate exposure time is determined based on incident power of a collimated light beam from the at least one collimated light source (e.g:, an incident power of a UV light) and a desired length of one or more waveguides. The collimated light beam from the at least one collimated light source is directed to the mask for a period of exposure time so that a portion of the collimated beam passes through the mask and is guided by the at least one aperture into the photo-monomer to form at least one waveguide through a portion of the volume of the photo-monomer. Here, the at least one waveguide has a cross-sectional geometry substantially matching the designed aperture geometry on the mask.

In one embodiment as shown in block 1050, multiple collimated beams at different incident directions and/or angles are directed through the mask for a given amount of time.

Alternatively, as shown in blocks 1050a, a single collimated beam at a given direction and angle is directed through the mask for a given amount of time. Then, at block 1050b, the collimated light beam is moved with respect to the mask and the exposure is repeated.

Then, at block 1060, any uncured photo-monomer is removed to leave behind a three-dimensional ordered polymer microstructure (or an open-cellular polymer micro-truss structure). Here, in one embodiment, the plurality of polymer waveguides are used to form the three-dimensional ordered polymer microstructure, and the three-dimensional ordered polymer microstructure corresponds with the pattern of the plurality of apertures.

The resulting three-dimensional polymer microstructure can be formed in seconds in the area where exposed to the incident collimated beam. Since the incident light and the monomer remain fixed with respect to one another during the formation of a polymer waveguide, the exposure area of the collimated beam(s) can be scanned over a larger surface area of monomer, leading to the formation of large-area structures. Alternatively, in one embodiment, a volume of monomer can continuously be fed under a fixed incident light pattern (created from a mask and collimated light) leading to a path for mass production.

As described, once the polymer cellular structure is formed in the volume of monomer, the remaining un-polymerized material (monomer) is removed leaving an open cellular polymer material that is the three-dimensional ordered microstructure (or the open-cellular polymer micro-truss structure). By way of example, a solvent that dissolves the monomer (but not the polymer) may be used to aid in the monomer removal.

With reference back to FIGS. 1 and 2, the truss elements 12, 14, 16 of the microstructure 10 define an open volume (i.e. free space) of the microstructure 10. In one embodiment, the microstructure 10 defines a free space of not less than about 40% by volume and not greater than about 99% by volume. In another embodiment, the microstructure 10 defines a free space of not less than about 70% by volume and not greater than about 95% by volume.

The truss elements 12, 14, 16 intersect at the nodes 18 to form symmetrical angles in three dimensions (three orthogonal directions). The symmetrical angles relative to the xz-plane (see, FIG. 1), can measure between 0° and 90°. That is, truss elements 12, 14, 16 interpenetrate each other to form "perfect" nodes: each of the truss elements 12, 14, 16 defines an angle relative to a compression surface of the microstructure 10 (e.g. a surface extending along a direction of the xz-plane), and the respective angles defined by the truss elements 12, 14, 16 are substantially equal to one another. However, embodiments of the present invention are not limited thereto. The truss elements 12, 14, 16 have an intrinsically high strength due to their small scale. In one embodiment, each of the truss elements 12, 14, 16 has a diameter of between 10 µm and 2 mm. In another embodiment, each of the truss elements 12, 14, 16 has a diameter of not greater than about 500 µm.

In another embodiment, each of the truss elements 12, 14, 16 has a diameter of not greater than about 200 µm. In another embodiment, each of the truss elements 12, 14, 16 has a diameter of not greater than about 1 µm. The truss elements 12, 14, 16 are configured to have a correspondingly small aspect ratio (e.g., length/diameter ratio) for withstanding a bending moment. Here, each of the truss elements 12, 14, 16 has a length not greater than 100 µm such that the truss elements can better withstand a mechanical load applied to the microstructure 10. As such, the truss elements 12, 14, 16 experience little, if any, bending deformation during application of the mechanical load to the microstructure 10.

At certain size scales or diameters (e.g., the size scales or diameters described above), the strength of the truss elements is increased, which corresponds to an increased strength of the microstructure 10. In one embodiment, each of the truss elements 12, 14, 16 has molecular alignment extending along an axial direction of the truss element. As such, an anisotropic material is produced, which provides a substantial degree of stiffness and/or strength along the axial direction. In one embodiment, in a material that is composed of long molecular chains (e.g., polymers), the molecules thereof can be aligned along a direction to provide an increased degree of mechanical strength and/or stiffness along the alignment direction. In more detail, where the molecular alignments of the truss elements 12, 14, 16 extend along the corresponding axial directions, the truss elements 12, 14, 16 are configured to axially transfer a mechanical load applied to the microstructure 10.

As described above, the microstructure 10 withstands the mechanical load, e.g., via axial tension and compression of the truss elements 12, 14, 16. Molecular alignment of the truss elements 12, 14, 16 along their respective axial directions lends additional strength and/or stiffness to the truss elements 12, 14, 16 and, accordingly, also to the microstructure 10.

In one embodiment, the truss elements 12, 14, 16 are configured to provide the microstructure 10 with a stretch-dominated behavior under a compression load applied to the microstructure 10. Such stretch-dominated behavior is contrasted from the bending-dominated behavior (e.g. of randomly oriented cellular structures), as described in Ashby, "The Properties Of Foam And Lattices," Philosophical Transactions—Royal Society Of London Series A Mathematical Physical And Engineering Sciences, Vol. 364, 2006, which is incorporated by reference herein in its entirety.

In a bending-dominated structure, the elastic modulus is proportional to the square of the relative density $\rho'/\rho_s'$, where $\rho'$ is the density of the cellular material and $\rho_s'$ is the density of the solid from which it is constructed. In contrast, a stretch-dominated structure (such as microstructure 10), has a compressive elastic modulus (E) directly proportional to both the relative density thereof and the modulus ($E_s$) of the solid material portion of the microstructure 10, as expressed in equation (1) below:

$$E = E_s (\sin^4 \theta)(\rho/\rho_s) \qquad (1)$$

where $\rho$ is a density of the microstructure 10, $\rho_s$ is a density of a solid material portion of the microstructure 10, $\theta$ is an angle of at least one of the truss elements 12, 14, 16 relative to a compression surface of the microstructure 10, and $E_s$ is a modulus of the solid material portion of the microstructure 10. As such, the elastic modulus of a structure of embodiments of the present invention is also proportional to a geometric function of the angle $\theta$ of the structure, and $\theta$ can accordingly be chosen to vary (e.g., increase or reduce) the elastic modulus.

Figure 6:
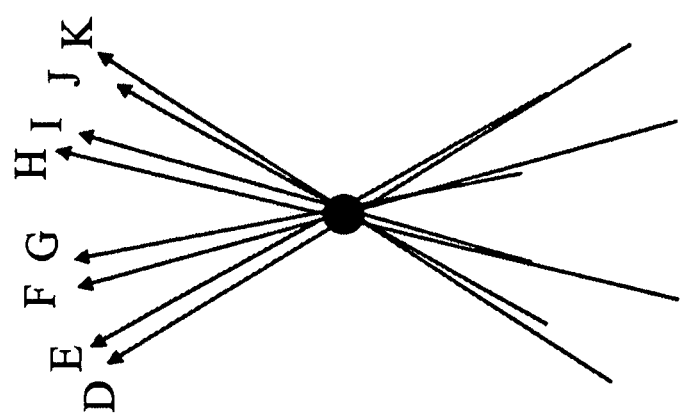
FIG. 6 is a perspective schematic view showing respective directions along which truss elements of a structure of an embodiment of the present invention extend.

With reference back to FIGS. 1 and 2, the microstructure 10 includes truss elements 12, 14, 16 respectively extending along A, B, and C directions. However, embodiments of the present invention are not limited thereto. For example, with reference to FIG. 6, a structure of an embodiment of the present invention may include truss elements defined by self-propagating polymer waveguides and extending along D, E, F, G, H, I, J and K directions, respectively. For example, a structure according to an embodiment of the present invention may include eight truss elements, each of which extends along a corresponding one of eight varying directions. Here, similar to the embodiment shown in FIGS. 1 and 2, the eight truss elements interpenetrate each to form nodes of a continuous material with a three-dimensional microstructure order. However, embodiments of the present invention are not limited thereto, and may include more or fewer than eight truss elements.

In a further embodiment of the present invention, one or more truss elements of a cellular structure are coated with a material different from the material of the cellular structure itself to adjust the material transfer behavior thereof. Also in a further embodiment of the present invention, base elements of a cellular structure are coated with a material different from the material of the cellular structure itself, and the base elements are removed to create a self-supporting structure having continuous but separated volumes.

The size, scale and the features of structures of the present invention can be utilized in mass transfer and/or phase separation applications.

Embodiments of the present invention provide a set of mass transfer and/or phase separation applications for ordered cellular materials (e.g., the microstructure 10 as described above and depicted in FIGS. 1 and 2). Fabrications of polymer versions of these materials as well as conversion into metallic and ceramic versions are described in U.S. Pat. No. 7,382,959, entitled "Optically Oriented Three-Dimensional Polymer Microstructures," the entire content of which is incorporated herein by reference; in U.S. patent application Ser. No. 11/870,379, entitled "Ordered Open-Cellular Carbon Microstructures And Method Of Making Same," the entire content of which is incorporated herein by reference; and in U.S. patent application Ser. No. 12/074,727, entitled "Ceramic Microtruss," the entire content of which is incorporated herein by reference. Any of these materials, polymers, metals (including aluminum, copper, steel, etc.), and ceramics (including alumina, yttria stabilized zirconia (YSZ), silicon carbide (SiC), diamond) could be used in these applications although metals are preferred in one embodiment. In embodiments of the present invention, the applications involve use of specific micro-truss materials in mass transfer and are mostly in the realm of the chemical process industry. Also, in embodiments of the present invention, multiple layers of the micro-architected open cellular (micro-truss) structures are stacked adjacent to one other (e.g., stacked adjacent and mechanically connected to one another or stacked adjacent (and not mechanically connected to one another)) to achieve desired thicknesses for certain mass transfer and/or phase separation applications.

In embodiments of the present invention, the micro-architected open cellular (micro-truss) structures (after conversion to the desired material) are used as packing in mass transfer (either mixing or separating) applications. One implementation, stripping, is depicted in the embodiments shown in FIGS. 7a and 7b. In this stripping application, an air stream (stream A) with volatile organics (VOCs) and a water stream (stream B) enter the column packed with the micro-truss. The high surface area to volume ratio of the packing provides increased area for mass-transfer of the VOCs from the air to the water, thus purifying the air before exhaust. In addition, it should be apparent to those skilled in the art that the embodiments of FIGS. 7a and 7b can be applicable to any suitable mass transferring applications. As such, the embodiments of FIGS. 7a and 7b are not limited to just stripping, and stripping includes more applications than just stripping of VOCs from air into water.

Figures 7A, 7B:
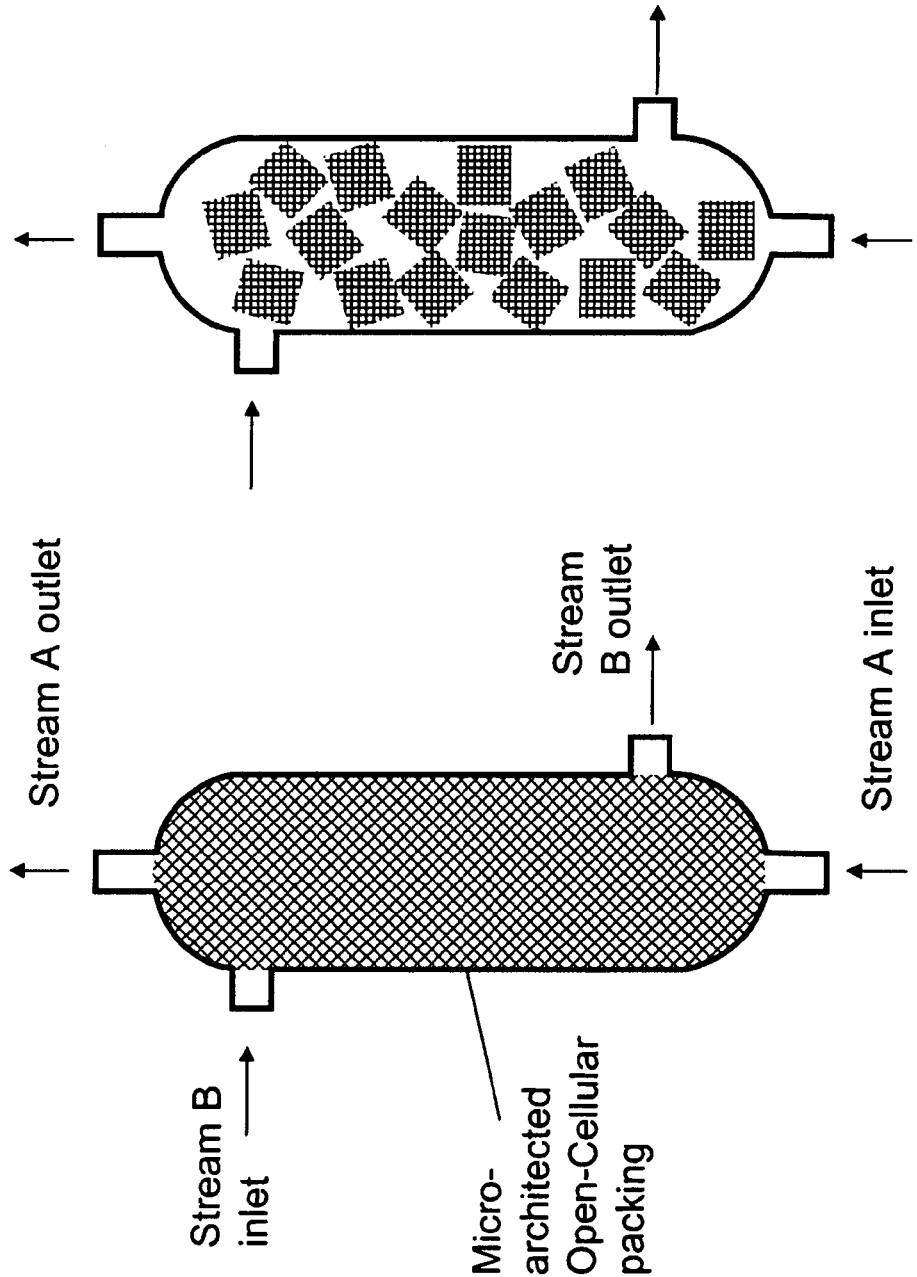

More specifically, FIG. 7a schematically illustrates a mass transfer system in the form of a mass-transfer column packed with an ordered micro-architected open-cellular material or packing (having a plurality of three-dimensional ordered pores), and FIG. 7b schematically illustrates a mass transfer system in the form of a mass-transfer column packed with small bricks (or packings) of ordered open-cellular material with the relative position of each brick being random.

Here, in the embodiments of FIGS. 7a and 7b, the surface area to volume ratio of a micro-truss with strut radius of 50 microns, strut length of 900 microns, and angle of 40 degrees is about 2000 $m^2/m^3$. The void fraction for such a structure is about 0.91. By contrast, the values for random packings range from 50 to 1000 $m^2/m^3$ for the surface area to volume ratio, and range from 0.6 to 0.97 for the void fraction. The values for existing structured packings range from 100 to 700 $m^2/m^3$ for the surface area to volume ratio, and range from 0.90 to 0.97 for the void fraction. Further enhancements of the micro-truss for a given application would yield higher surface area to volume ratios and void fractions.

Higher surface area to volume ratio (a factor of 2 to 200 or even more) leads to increased mass transfer. Increased mass transfer means columns can be built shorter for the same effectiveness and will consume less energy through pumping. In addition, ordered packing with high void fractions reduces pressure drop and thereby also reduces energy needed for pumping.

FIG. 7c schematically illustrates a mass transfer system in the form of a mass-transfer column packed with a completely ordered open-cellular material. As in the systems shown in FIGS. 7a and 7b, the mass transfer system of FIG. 7c is for stripping, adsorption, liquid-liquid extraction, and/or scrubbing.

In FIG. 7c, the mass-transfer column includes a housing, a stream A inlet, a stream B inlet, a stream A outlet, and a stream B outlet. Here, FIG. 7c shows that stream A entering through the stream A inlet and the stream B exiting thought the stream B outlet have to pass through a fluid distributor for stream A and/or a collector for stream B to facilitate stream distribution and/or collection, and shows that stream B entering through the stream B inlet and the stream A exiting thought the stream A outlet have to pass through a fluid distributor for stream B and/or a collector for stream A to facilitate stream distribution and/or collection. Furthermore, FIG. 7c schematically shows that the housing of the mass-transfer column is packed with an open cellular (micro-truss) packing (having a plurality of three-dimensional ordered pores) to increase the area for mass-transfer.

FIGS. 7d, 7e, and 7f schematically illustrate mass transfer systems in the forms of mass-transfer columns according to other embodiments of the present invention. Here, the streams passing through the mass-transfer column can be counter-current as depicted in FIGS. 7a, 7b, and 7c; or can be co-current as depicted in FIG. 7d; or cross-current as depicted in FIG. 7e. In addition, the streams passing through the mass-transfer column can be baffled as shown in FIG. 7f. That is, FIG. 7f schematically shows a mass-transfer column including a housing packed with an open cellular (micro-truss) packing (having a plurality of three-dimensional ordered pores), and baffles formed within the chamber defined by the housing with the packing.

The present invention, however, is not limited to the applications as depicted in FIGS. 7a, 7b, 7c, 7d, 7e, and 7f. For example, as envisioned, the mass transfer applications according to embodiments of the present invention can include:

1. gas-liquid contacting applications
   a. distillation/fractionation
      i. atmospheric pressure distillation
      ii. vacuum distillation (preferred embodiment)
   b. adsorption
   c. stripping
2. liquid-liquid contacting applications
   a. liquid-liquid extraction
3. static fluid-fluid mixing
4. phase separation applications
   a. liquid-gas separation
      i. mist collectors
      ii. impingement separation
      iii. electrostatic precipitators
   b. solid-gas separation (dust)
      i. impingement separation
      ii. filtration (either as filter or as filter support)
      iii. electrostatic precipitators
   c. liquid-solid separation
      i. impingement separation
      ii. filtration (either as filter or as filter support)
      iii. electrostatic precipitators
   d. screens for solid-solid (particulate) separation
      i. vibrating screens for size selection/sorting
5. packed bed reactors Here, in embodiments of the present invention, the micro-truss is particularly well-suited for vacuum distillation applications. The ordered nature and large void fraction leads to low pressure drops required to maintain low pressure through the column. In addition, the micro-truss is a structural material and can be integrated into the system to bear some of the mechanical load (in vacuum distillation this will come in the form of external pressure).

Figure 8C:
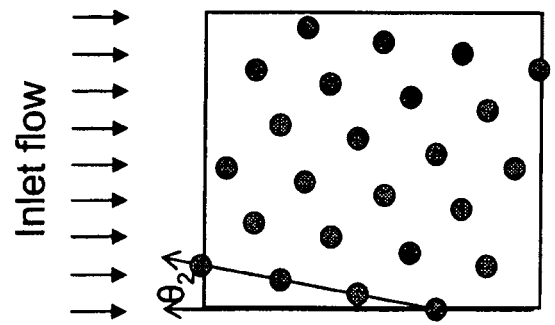
FIGS. 8a, 8b, and 8c schematically illustrate a mass transfer system in the forms of angle-dependent solid particulate or liquid droplet filtration/separation systems according to embodiments of the present invention.
Figure 8B:
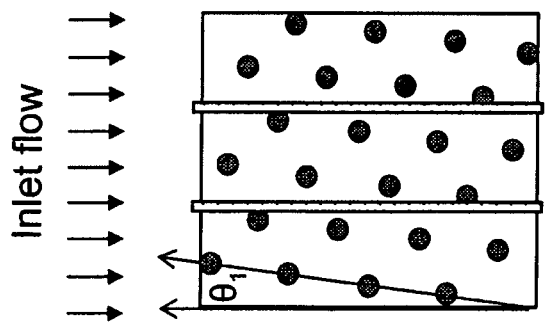
Figure 8A:
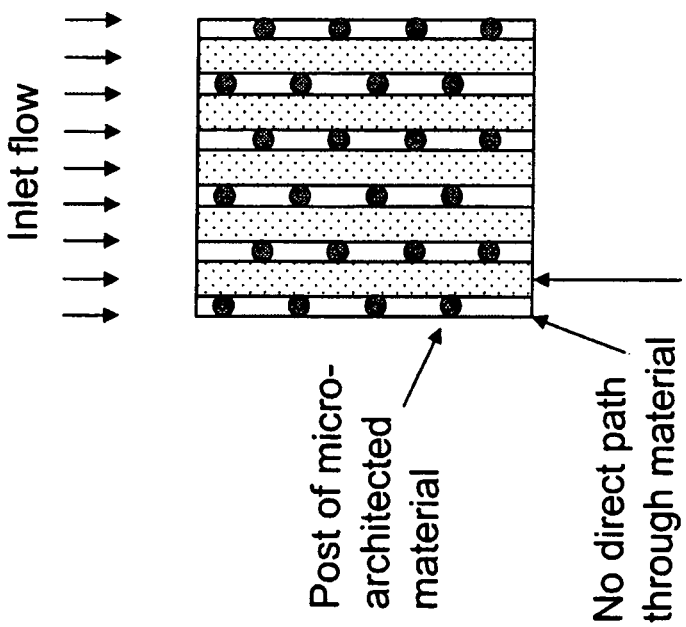

In other embodiments of the present invention, impingement separation and filtration applications can make use of the anisotropy of the micro-truss to achieve tunable operation. FIGS. 8a, 8b, and 8c show that by altering the relative angle $\theta$ between the inlet flow and micro-truss, the separation conditions can be tuned. The relative angle $\theta$ can be altered either by changing the gas flow direction or by changing the orientation of the micro-truss. This architecture and tuning could also be used for controllable static mixing applications.

In more detail, the properties tuned are: 1) pressure drop across the filter or membrane, which increases with increasing angle $\theta$; and/or 2) filtration or separation efficiency—referred to as—1–[downstream particle or impurity concentration]/[upstream particle or impurity concentration]—which also increases with increasing angle $\theta$. Here, efficiency=1–x (or one minus x), where x=[downstream concentration]/[upstream concentration]; and the angle $\theta$ refers to magnitude of the angle $\theta$ (or absolute value) since +$\theta$ and –$\theta$ will have similar effects. Also, the angle $\theta$ is periodic, so these correlations only hold over a range of $\theta$ (the range being defined by the micro-truss geometry)—at even higher values of $\theta$ (outside the range) the pores come back into alignment and then pressure drop and filtration/separation efficiency begin to decrease with increasing $\theta$ (after which they come back out of alignment, then back into alignment, etc.)

More specifically, FIG. 8a schematically illustrates a mass transfer system in the form of an angle-dependent solid particulate filtration/separation system with maximum flow, minimum pressure drop, and minimum filtration alignment; FIG. 8b illustrates a mass transfer system in the form of an angle-dependent solid particular filtration/separation system with an intermediate case alignment; and FIG. 8c illustrates a mass transfer system in the form of an angle-dependent solid particular filtration/separation system with minimum flow, maximum pressure drop, and maximum filtration alignment. Here, in the embodiments of FIGS. 8a, 8b, and 8c, the relative angle between the inlet flow and micro-truss of FIG. 8a is shown to be about zero degrees; and the relative angle $\theta_1$ between the inlet flow and micro-truss of FIG. 8b is shown to be less than the relative angle $\theta_2$ between the inlet flow and micro-truss of FIG. 8c. In more detail, the theta angle $\theta_1$, $\theta_2$ of FIGS. 8a,b,c is the angle between the incident flow direction and a set of passages that have an unobstructed linear path directly through the micro-truss. One preferred embodiment of the present invention is for this set of passages to be the set which includes individual passages which have the largest cross-sectional area of all passages through the particular micro-truss. In addition, the present invention is not limited by the embodiments of FIGS. 8a, 8b, and 8c, and it should be apparent to those skilled in the art that, since the micro-truss is periodic, it could be that the angle of the intermediate case is greater than the minimum flow case (as the posts come back into alignment).

Figure 9:
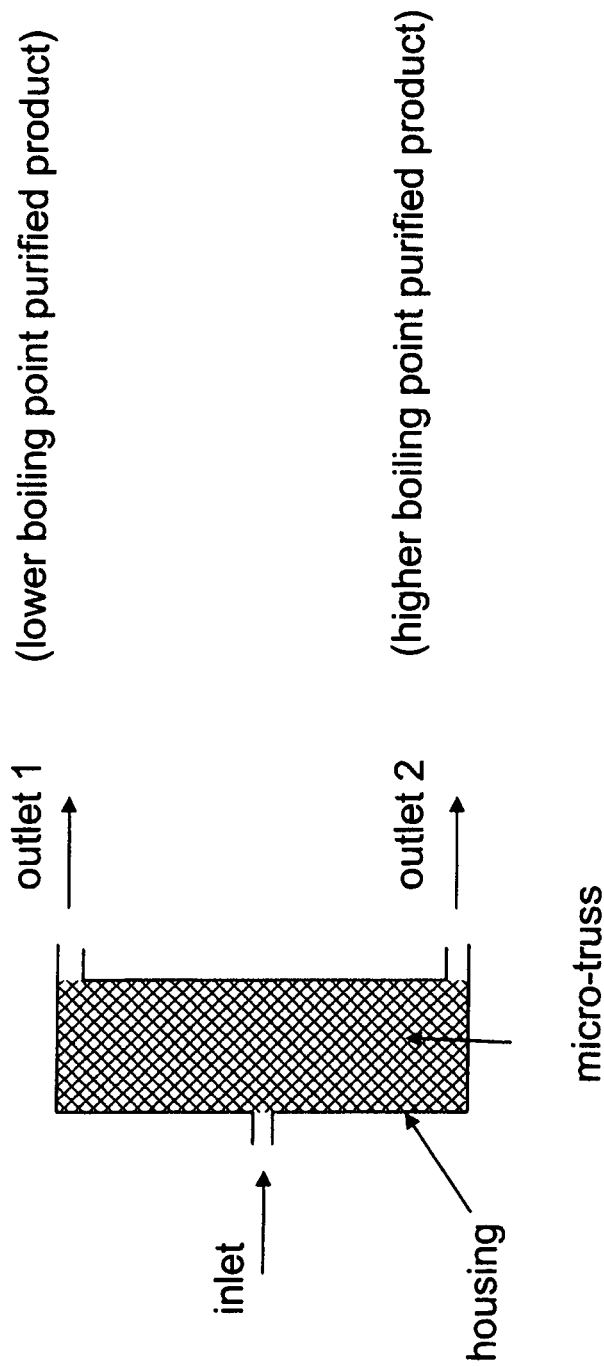
FIG. 9 schematically illustrates a mass transfer system in the form of a distillation system according to an embodiment of the present invention.

FIG. 9 schematically illustrates a mass transfer system in the form of a distillation system according to an embodiment of the present invention. In FIG. 9, the distillation system includes a housing, an inlet on one side of the housing, and a first outlet 1 and a second outlet 2 on the other side of the housing. Here, the first outlet 1 is for discharging lower boiling point purified product and the second outlet 2 is for discharging higher boiling point purified product. Furthermore, FIG. 9 schematically shows that the housing is packed with the open cellular (micro-truss) packing.

Figure 10:
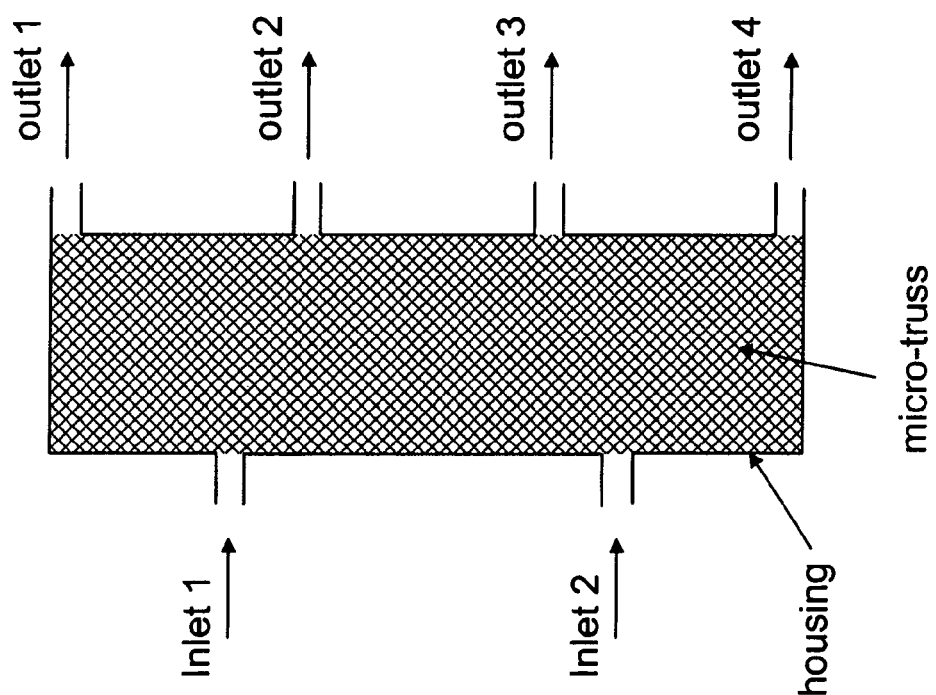
FIG. 10 schematically illustrates a mass transfer system in the form of a distillation system according to another embodiment of the present invention.

FIG. 10 schematically illustrates a mass transfer system in the form of a distillation system according to another embodiment of the present invention. In FIG. 10, the distillation system includes a housing, a first inlet 1 and a second inlet 2 on one side of the housing, and a first outlet 1, a second outlet 2, a third outlet 3, and a fourth outlet 4 on the other side of the housing. In addition, FIG. 10 schematically shows that the housing is packed with the open cellular (micro-truss) packing.

Figure 11:
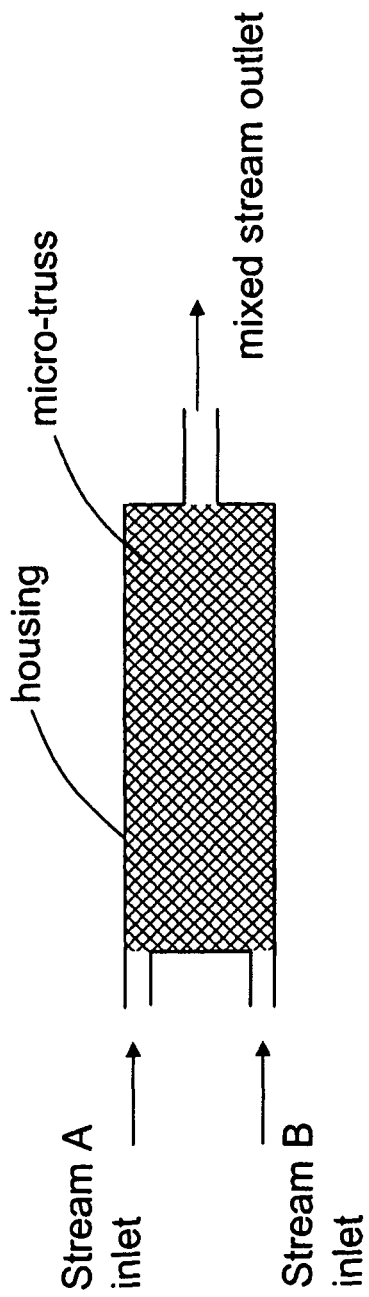
FIG. 11 schematically illustrates a mass transfer system in the form of an apparatus for static fluid mixing according to an embodiment of the present invention.

FIG. 11 schematically illustrates a mass transfer system in the form of an apparatus for static fluid mixing according to an embodiment of the present invention. In FIG. 11, the apparatus for static fluid mixing includes a housing, a stream A inlet and a stream B inlet on one side of the housing, and a mixed stream outlet on the other side of the housing. Furthermore, FIG. 11 schematically shows that the housing is packed with the open cellular (micro-truss) packing. In addition, an apparatus for static mixing of the present invention is not limited by the embodiment shown in FIG. 11. For example, in another embodiment, an apparatus for static fluid mixing can have two mixed stream outlets.

Figure 12:
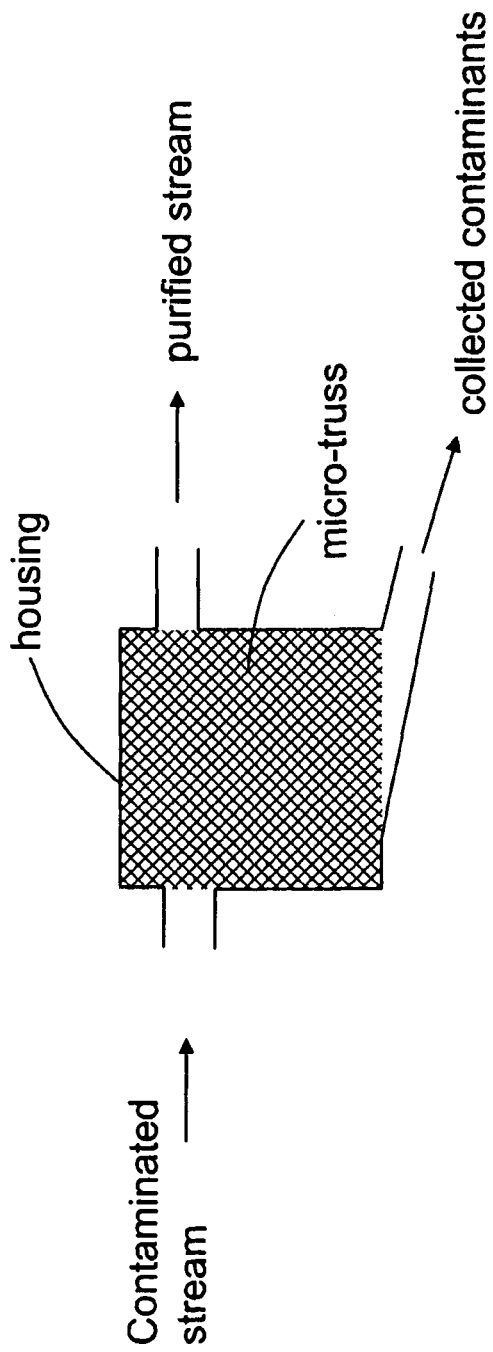
FIG. 12 schematically illustrates a mass transfer system in the form of an apparatus for mist collection (or impingement separation) according to an embodiment of the present invention.

FIG. 12 schematically illustrates a mass transfer system in the form of an apparatus for mist collection (or impingement separation) according an embodiment of the present invention. In FIG. 12, the apparatus for mist collection (or impingement separation) includes a housing, an inlet for receiving a contaminated stream on one side of the housing, a purified stream outlet on the other side of the housing, and a collected contaminate outlet at a lower portion of the housing. In addition, FIG. 12 schematically shows that the housing is packed with the open cellular (micro-truss) packing. Here, the apparatus shown in FIG. 12 can be operated as an apparatus for mist collection for purifying a vapor stream by collecting aerosolized liquid droplets, an apparatus for impingement separation for purifying a vapor stream by collecting aerosolized solid particles, or an apparatus for impingement separation for purifying a liquid stream by collecting suspended solid particles.

Figures 13A, 13B:
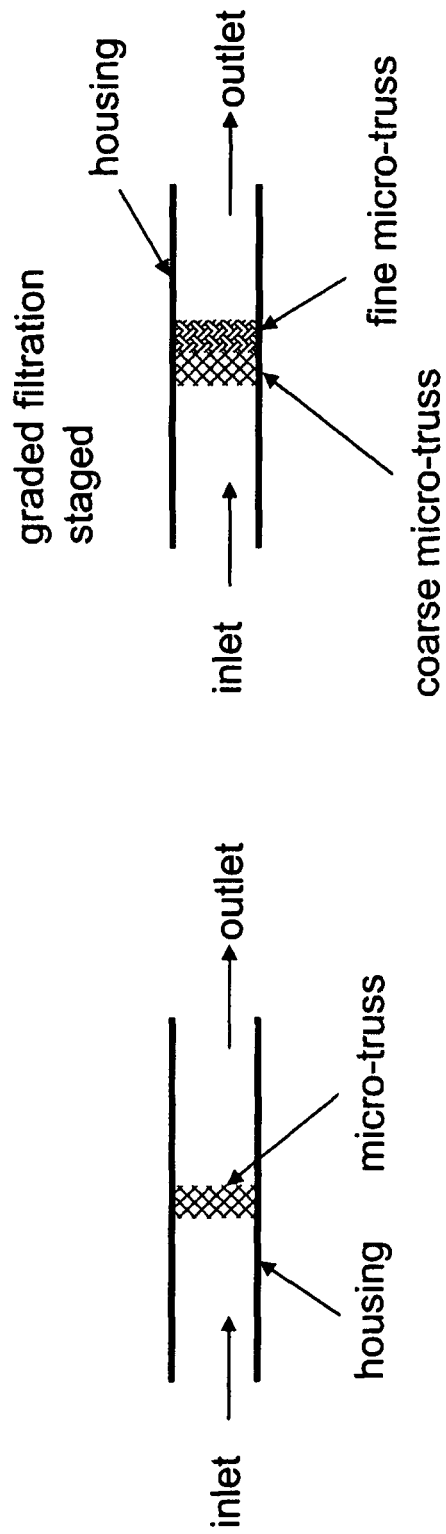
FIGS. 13a and 13b schematically illustrate mass transfer systems in the forms of filtering systems according to embodiments of the present invention.

FIGS. 13a and 13b schematically illustrate mass transfer systems in the forms of filtering systems according to embodiments of the present invention. Here, the embodiments of FIGS. 13a and 13b both utilize their micro-trusses as the filters. Specifically, in FIG. 13a, the filtering system includes a housing, an inlet for receiving a contaminated stream on one side of the housing, a purified stream outlet on the other side of the housing, and an open cellular (micro-truss) packing in the housing and between the inlet and the outlet. In FIG. 13b, the filtering system includes a housing, an inlet for receiving a contaminated stream on one side of the housing, a purified stream outlet on the other side of the housing, and an open cellular (micro-truss) packing with a coarse micro-truss layer and a fine micro-truss layer in the housing and between the inlet and the outlet. Here, the coarse micro-truss layer is placed closer to the inlet, and the fine micro-truss layer is placed closer to the outlet such that the filtering system in FIG. 13b can be provided with graded filtration stages.

Figure 14B:
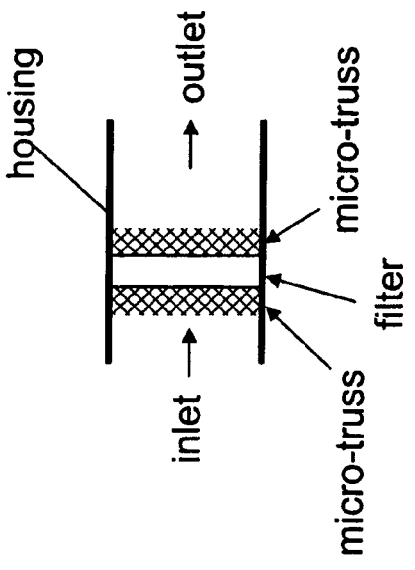
FIGS. 14a, 14b, and 14c schematically illustrate mass transfer systems in the forms of filtering systems according to embodiments of the present invention.
Figure 14C:
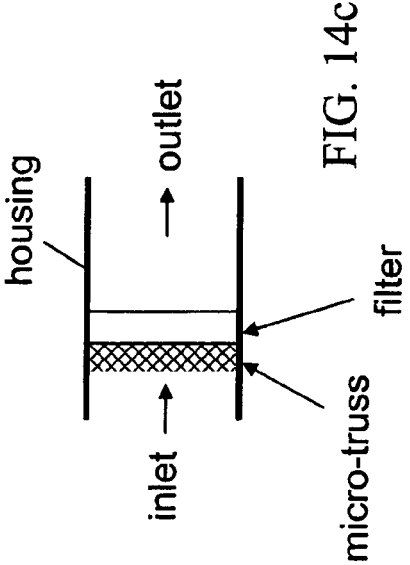
Figure 14A:
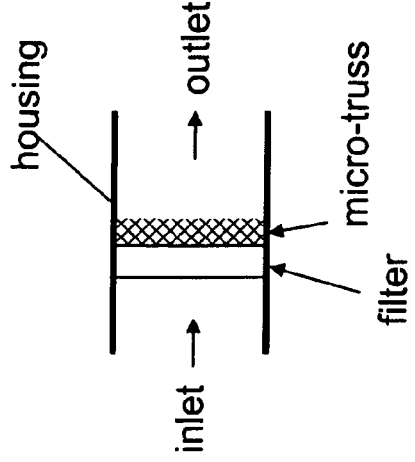

FIGS. 14a, 14b, and 14c schematically illustrate mass transfer systems in the forms of filtering systems according to embodiments of the present invention. Here, unlike the embodiments of FIGS. 13a and 13b, the embodiments of FIGS. 14a, 14b, and 14c utilize their micro-trusses as filter support. In some embodiments, the micro-trusses are used primarily as filter support, but could also serve some filtration functions. Specifically, in FIG. 14a, the filtering system includes a housing, an inlet for receiving a contaminated stream on one side of the housing, a purified stream outlet on the other side of the housing, a filter, and an open cellular (micro-truss) packing in the housing and between the inlet and the outlet. Here, the filter is supported on the micro-truss; and, in this embodiment, the filter is placed closer to the inlet than the micro-truss. In FIG. 14b, the filter is placed or sandwiched between two micro-truss supports. In FIG. 14c, the micro-truss is placed closer to the inlet than the filter.

Figure 15:
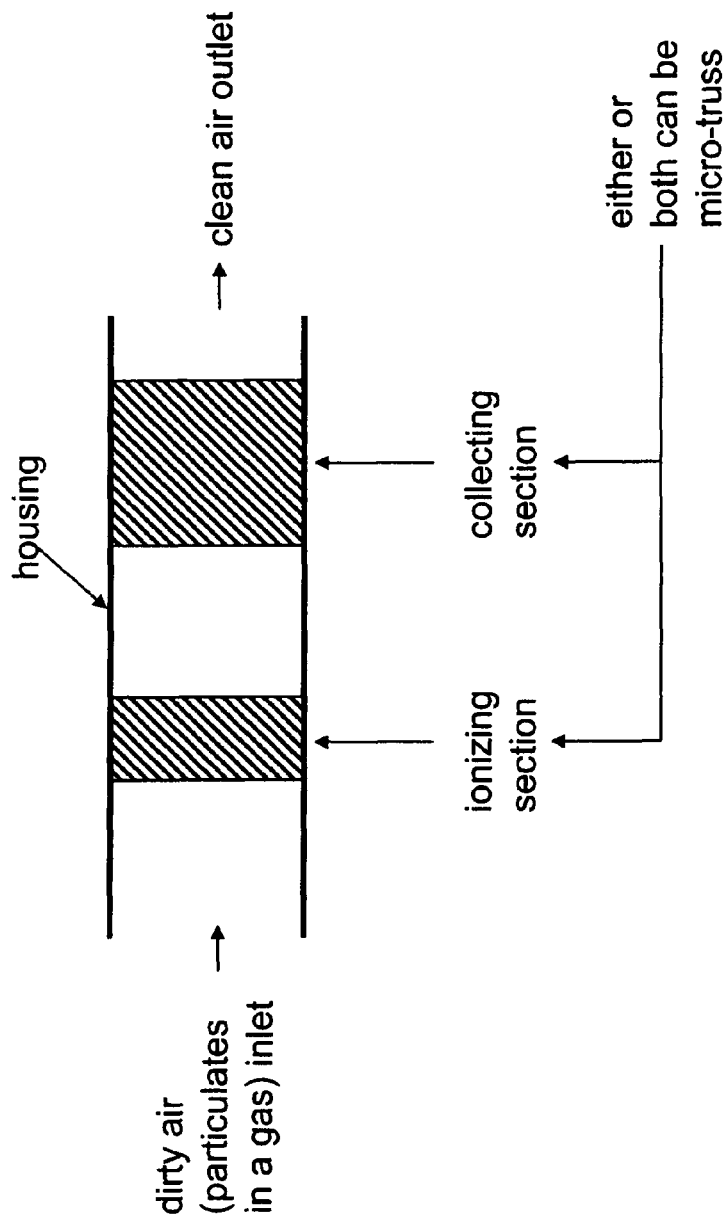
FIG. 15 schematically illustrates a mass transfer system in the form of an apparatus for electrostatic precipitation according to an embodiment of the present invention.

FIG. 15 schematically illustrates a mass transfer system in the form of an apparatus for electrostatic precipitation according to an embodiment of the present invention. In FIG. 15, the apparatus for electrostatic precipitation includes a housing, an ionizing section, and a collecting section. As shown in FIG. 15, both the ionizing section and the collecting section are formed in the housing, and either the ionizing section and/or the collecting section can be formed by a micro-truss material as discussed above. Here, in operation, dirty air (particulates in a gas) enter from one end of the housing closer to the ionizing section, and clean air exits from the other end of the housing closer to the collecting section. The present invention, however, is not limited to the embodiment as depicted in FIG. 15. For example, in another embodiment of the present invention, an apparatus for electrostatic precipitation according to an embodiment of the present invention can have an ionizing section and a collecting section that are penetrating as shown in FIG. 16.

Figure 16:
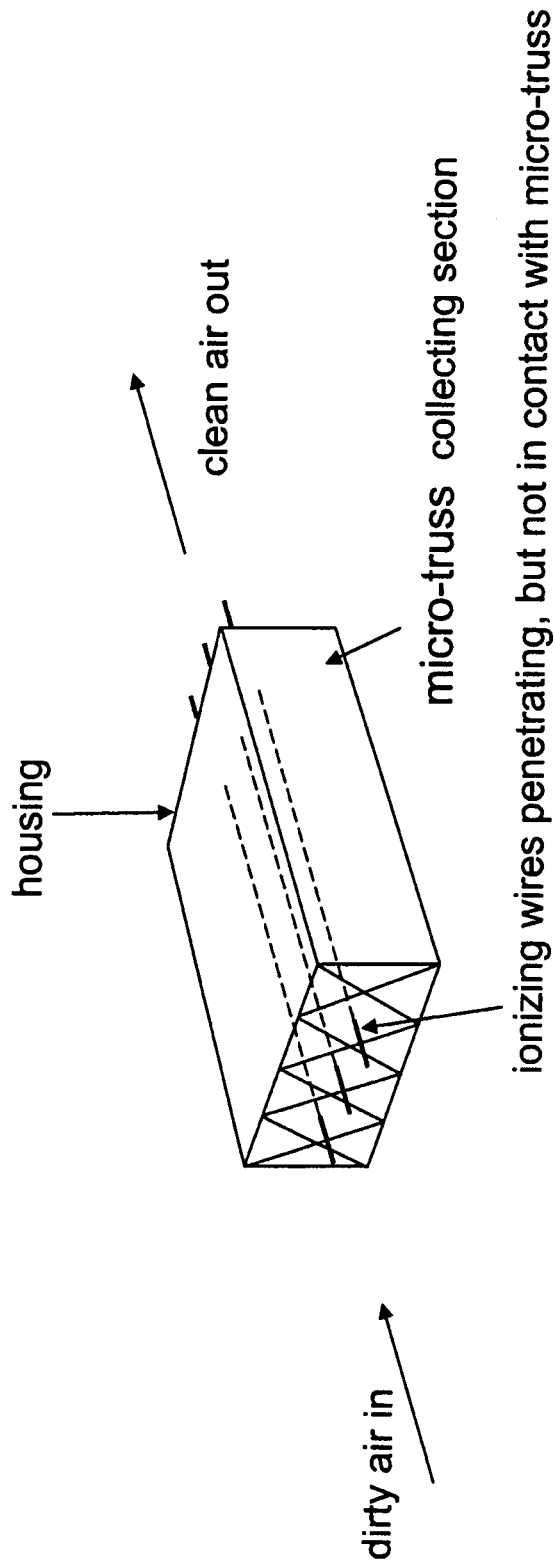
FIG. 16 schematically illustrates a mass transfer system in the form of an apparatus for electrostatic precipitation according to another embodiment of the present invention.

In more detail, FIG. 16 shows ionizing wires penetrating, but not in contact with the micro-truss collection section formed in a housing of the apparatus for electrostatic precipitation.

Figure 17:
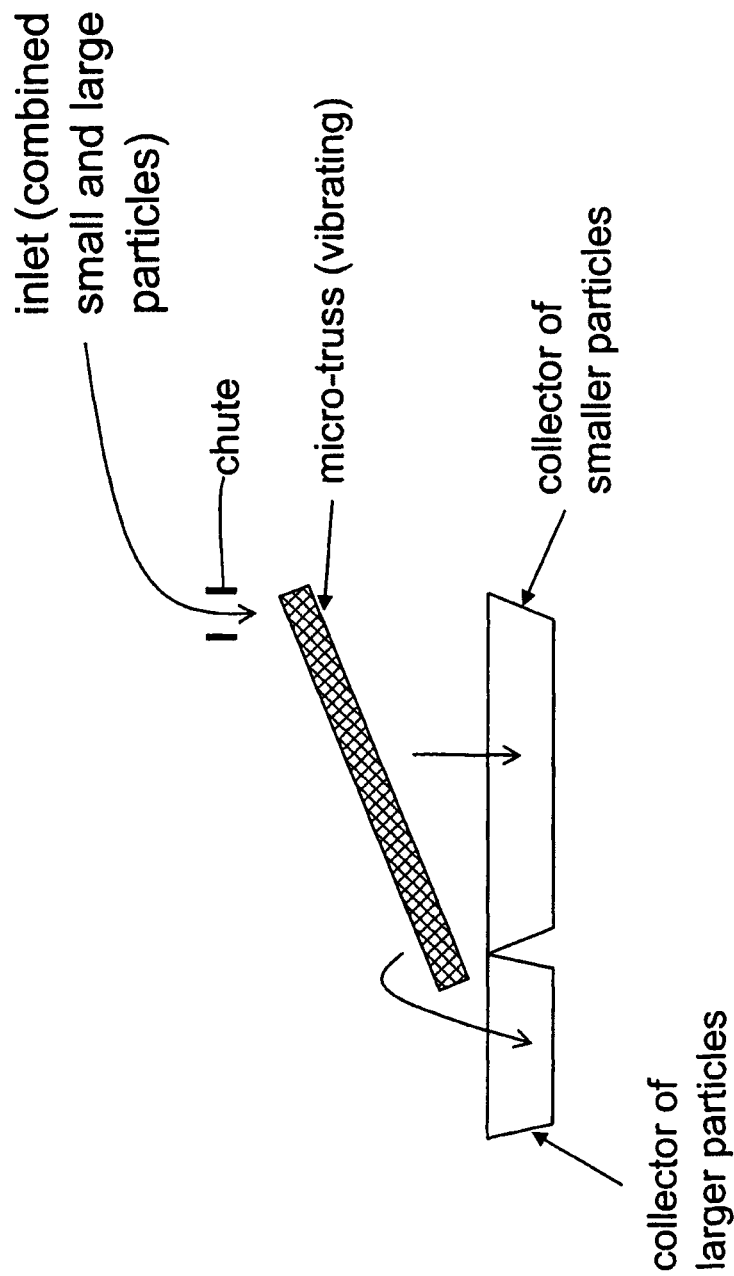
FIG. 17 schematically illustrates a mass transfer system in the form of a solid particle sorting apparatus according to an embodiment of the present invention.

FIG. 17 schematically illustrates a mass transfer system in the form of a solid particle sorting apparatus according to an embodiment of the present invention. In FIG. 15, the solid particle sorting apparatus includes an inlet, a chute, a micro-truss sorter, a collector of larger particles, and a collector of smaller particles. Here, in operation, a combination of small and large particles are provided into the inlet, and are sorted by the vibrating micro-truss sorter such that larger particles are collected at the collector of larger particles and smaller particles passing though the micro-truss sorter are collected at the collector of smaller particles.

Figure 18:
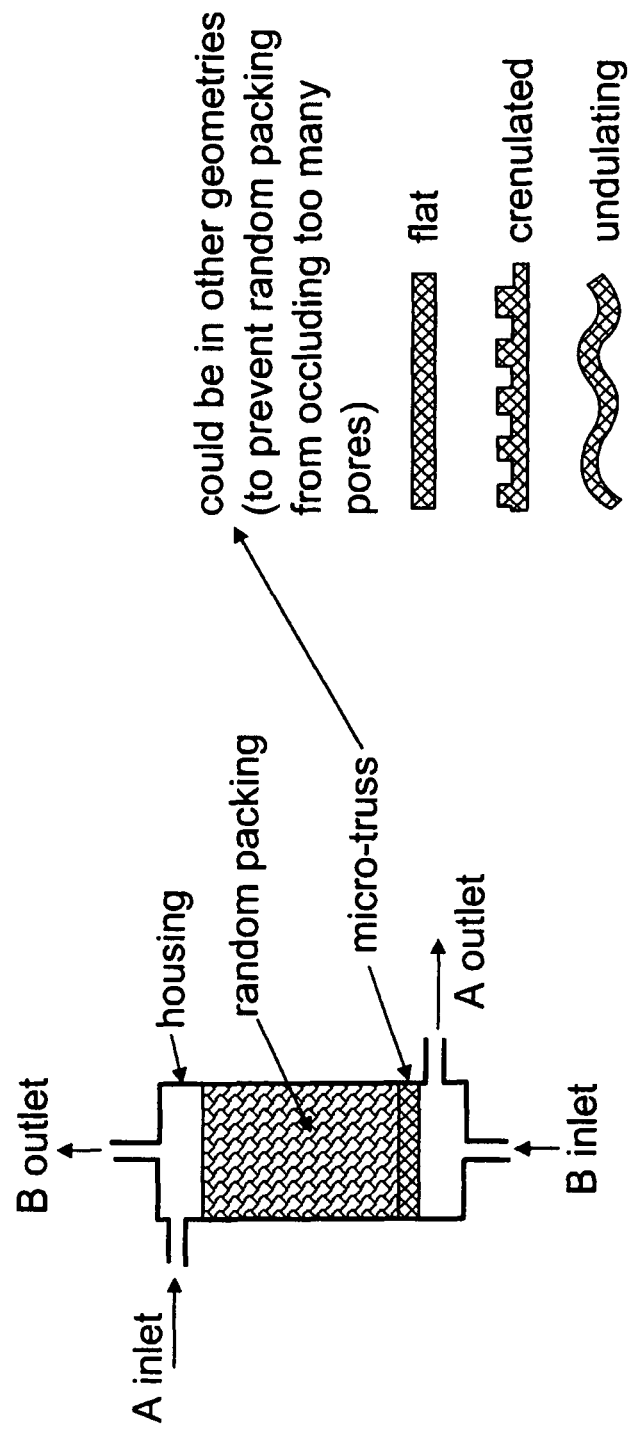
FIG. 18 schematically illustrates an apparatus for support of a randomly packed mass transfer column according to an embodiment of the present invention.

FIG. 18 schematically illustrates an apparatus for support of a randomly packed mass transfer column according to an embodiment of the present invention. The mass transfer column depicted in FIG. 18 is designed for liquid-liquid or liquid-gas mass transfer applications (such as stripping). In FIG. 18, the mass transfer column includes a housing, a stream A inlet, a stream B inlet, a stream A outlet, and a stream B outlet. Here, FIG. 18 shows that stream A entering through the stream A inlet first passes through a random packing (or packings) supported on a micro-truss support before exiting thought the stream A outlet, and that stream B entering through the stream B inlet first passes through the micro-truss support supporting the random packing (or packings) before exiting thought the stream B outlet. Here, the structure of the micro-truss support could have various suitable geometries, such as flat, crenulated, undulating, etc., as shown in FIG. 18 to prevent the random packing (or packings) from occluding too many pores.

As envisioned in embodiments of the present invention, any of these materials, polymers, metals (including aluminum, copper, steel, etc.), and ceramics (including alumina, yttria stabilized zirconia (YSZ), silicon carbide (SiC), diamond, etc.) could be used as the mechanical members of the open cellular (micro-truss) packings, layers, supports, sections, and/or sorters as discussed above although metals are preferred in one embodiment. Also, in one embodiment of the present invention, the mechanical members of each these open cellular (micro-truss) packings has a three-dimensional order that is on a size scale (i.e., distance from one node to another node) between 30 μm and 5 mm (which leads to surface area to volume ratios higher than existing ordered packings (i.e., both structured and grid packings). In another embodiment, the mechanical members of each these open cellular (micro-truss) packings has a three-dimensional order that is on a size scale between 30 μm and 1 mm.

Further, in one embodiment of the present invention, each of these open cellular (micro-truss) packings has three-dimensional ordered pores which lead to lower pressure drop than random packings on a similar size scale. Also, in one embodiment of the present invention, each of these open cellular (micro-truss) packings has three-dimensional ordered mechanical load bearing members (or struts) which lead to higher mechanical stiffness and strength than random packings on a similar size scale.

In view of the foregoing and according to embodiments of the present invention, micro-structured ordered open cellular materials can be utilized for various suitable mass transfer applications, such as liquid-liquid extracting, gas-liquid contacting (distillation, adsorption, stripping), solid-liquid separation, liquid-liquid mixing, solid-gas separation (dust filtration, etc.), solid-solid separation (size sorting), etc.

Also, in an embodiment of the present invention, a mass transfer system includes a housing and a three-dimensional ordered open-cellular micro-truss material within the housing for a mass transfer application.

In one embodiment, the three-dimensional ordered open-cellular micro-truss material is an ordered open-cellular packing structurally packed within the housing.

In one embodiment, the three-dimensional ordered open-cellular micro-truss material is a plurality of bricks randomly packed within the housing.

In one embodiment, the three-dimensional ordered open-cellular micro-truss material is partially packed within the housing.

In one embodiment, the three-dimensional ordered open-cellular micro-truss material is a plurality of bricks orderly packed within the housing.

In one embodiment, the three-dimensional ordered open-cellular micro-truss material includes at least two different types of packing materials. The at least two different types of packing materials may include a ceramic packing material and a metal packing material.

In one embodiment, the three-dimensional ordered open-cellular micro-truss material includes a three-dimensional ordered open-cellular micro-truss metal material.

Here, the formations, functions, and/or structures of the above described mass transfer systems according to embodiments of the present invention can be derived from FIGS. 7 through 18 as discussed above.

While the invention has been described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. A mass transfer system comprising:
a housing comprising a plurality of inlets and a plurality of outlets; and
a three-dimensional ordered open-cellular micro-truss material within the housing for a mass transfer application, wherein the housing is configured with the three-dimensional ordered open-cellular micro-truss material to transport a first stream to contact a second stream to pass one or more material masses from the first stream to the second stream;
wherein the three-dimensional ordered open-cellular micro-truss material comprises:
a plurality of first truss elements defined by a plurality of first self-propagating polymer waveguides and extending along a first direction;
a plurality of second truss elements defined by a plurality of second self-propagating polymer waveguides and extending along a second direction; and
a plurality of third truss elements defined by a plurality of third self-propagating polymer waveguides and extending along a third direction,
wherein the first, second, and third truss elements interpenetrate each other at a plurality of first nodes to form a first continuous material; and
wherein the inlets and outlets are configured to transport a plurality of streams to and from the three-dimensional ordered open-cellular micro-truss material for the mass transfer application.

2. The mass transfer system of claim 1, wherein the three-dimensional ordered open-cellular micro-truss material is an ordered open-cellular packing within the housing.

3. The mass transfer system of claim 1, wherein the three-dimensional ordered open-cellular micro-truss material is a plurality of micro-truss bricks packed within the housing.

4. The mass transfer system of claim 1, wherein the three-dimensional ordered open-cellular micro-truss material is a plurality of micro-truss layers stacked adjacent to one another.

5. The mass transfer system of claim 1, wherein the three-dimensional ordered open-cellular micro-truss material is a plurality of micro-truss layers stacked adjacent and mechanically connected to one another.

6. The mass transfer system of claim 1, wherein the three-dimensional ordered open-cellular micro-truss material comprises at least two different types of packing materials.

7. The mass transfer system of claim 6, wherein the at least two different type of packing materials comprises a ceramic packing material and a metal packing material.

8. The mass transfer system of claim 1, wherein the three-dimensional ordered open-cellular micro-truss material comprises a three-dimensional ordered open-cellular micro-truss metal material.

9. The mass transfer system of claim 1, wherein the three-dimensional ordered open-cellular micro-truss material comprises a plurality of mechanical members having a three-dimensional order with a size scale between about 30 µm and about 5 mm to increase a surface area to volume ratio of the three-dimensional ordered open-cellular micro-truss material.

10. The mass transfer system of claim 1, wherein the three-dimensional ordered open-cellular micro-truss material comprises a plurality of mechanical members having a three-dimensional order with a size scale between about 30 µm and about 1 mm to increase a surface area to volume ratio of the three-dimensional ordered open-cellular micro-truss material.

11. The mass transfer system of claim 1, wherein the three-dimensional ordered open-cellular micro-truss material comprises a plurality of mechanical members each having a diameter between about 10 µm and about 2 mm to increase a surface area to volume ratio of the three-dimensional ordered open-cellular micro-truss material.

12. The mass transfer system of claim 1, wherein the three-dimensional ordered open-cellular micro-truss material comprises a plurality of three-dimensional ordered pores.

13. The mass transfer system of claim 1, wherein the three-dimensional ordered open-cellular micro-truss material comprises a plurality of three-dimensional ordered load bearing members to increase the mechanical stiffness and strength of the three-dimensional ordered open-cellular micro-truss material.

14. The mass transfer system of claim 1, wherein the inlets and the outlets are configured to transport a plurality of counter-current streams to and from the three-dimensional ordered open-cellular micro-truss material for the mass transferring application.

15. The mass transfer system of claim 1, wherein the inlets and the outlets are configured to transport a plurality of co-current streams comprising the first stream and the second stream to and from the three-dimensional ordered open-cellular micro-truss material for the mass transferring application.

16. The mass transfer system of claim 1, wherein the inlets and the outlets are configured to transport a plurality of cross-current streams comprising the first stream and the second stream to and from the three-dimensional ordered open-cellular micro-truss material for the mass transferring application.

17. The mass transfer system of claim 1, further comprising a first fluid distributor and collector and a second fluid distributor and collector, the first fluid distributor and collector and the second fluid distributor and collector being within the housing, wherein the housing comprises a first inlet, a second inlet, a first outlet, and a second outlet, and wherein the first fluid distributor and collector is configured such that the first stream entering through the first inlet and the second stream exiting through the second outlet have to pass through the first fluid distributor and collector, and wherein the second fluid distributor and collector is configured such that the second stream entering through the second inlet and the first stream exiting through the first outlet have to pass through the second fluid distributor and collector.

18. The mass transfer system of claim 1, wherein the mass transfer system is a gas-liquid contacting system, a liquid-liquid contacting system, a static fluid-fluid mixing system, a phase separation system, or a packed bed reactor system.

19. The mass transfer system of claim 1, wherein the ordered open-cellular micro-truss material is configured as a support for supporting a plurality of random packings within the housing on top of the ordered open-cellular micro-truss material.

20. The mass transfer system of claim 1, further comprising an ionizing section and a collecting section in the housing for an electrostatic precipitation application, wherein the ionizing section and/or the collecting section comprises the ordered open-cellular micro-truss material.

21. The mass transfer system of claim 1, wherein the ordered open-cellular micro-truss material comprises:
a first three-dimensional pattern comprising the first continuous material; and
a second three-dimensional pattern differing from the first three-dimensional pattern.

22. The mass transfer system of claim 21, wherein the first and second three-dimensional patterns have order in three dimensions.

23. The mass transfer system of claim 22, wherein the ordered open-cellular micro-truss material further comprises:
a plurality of fourth truss elements defined by a plurality of fourth self-propagating polymer waveguides of the second three-dimensional pattern and extending along a fourth direction;
a plurality of fifth truss elements defined by a plurality of fifth self-propagating polymer waveguides of the second three-dimensional pattern and extending along a fifth direction;
a plurality of sixth truss elements defined by a plurality of sixth self-propagating polymer waveguides of the second three-dimensional pattern and extending along a sixth direction; and
an interface,
wherein the fourth, fifth, and sixth truss elements interpenetrate each other at a plurality of second nodes to form a second continuous material, and wherein the interface comprises a plurality of third nodes for connecting the first continuous material to the second continuous material.

24. The mass transfer system of claim 1, wherein the ordered open-cellular micro-truss material is configured as a support for supporting a filter within the housing.

25. A solid particle sorting apparatus comprising:
a three-dimensional ordered open-cellular micro-truss sorter;
a collector of larger particles; and
a collector of smaller particles,
wherein an inlet is configured to receive small and large particles and to provide the small and large particles to the three-dimensional ordered open-cellular micro-truss sorter via a chute such that the small and large particles are sorted in three dimensions and collected at the collector of larger particles and the collector of smaller particles,
wherein the three-dimensional ordered open-cellular micro-truss sorter comprises a plurality of first truss elements extending along a first direction, a plurality of second truss elements extending along a second direction, and a plurality of third truss elements extending along a third direction, such that the first, second, and third truss elements interpenetrate each other at a plurality of first nodes to form an arrangement of regions of solid material and gaps between the regions of solid material, wherein the both the gaps and the regions of solid material are periodic in three orthogonal directions.

* * * * *